US012623200B2

(12) United States Patent　　　(10) Patent No.:　US 12,623,200 B2
Henninger et al.　　　　　　　　　(45) Date of Patent:　　May 12, 2026

(54) LATTICE STRUCTURE FOR SPARGING EVAPORATOR IN CATALYTIC INERTING SYSTEM

(71) Applicant: Parker-Hannifin Corporation, Cleveland, OH (US)

(72) Inventors: Daniel J. Henninger, Irvine, CA (US); Bryan D. Jensen, Buckeye, AZ (US); Daniel C. Massie, Mission Viejo, CA (US); Scott P. Auld-Hill, Orange, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 117 days.

(21) Appl. No.: 18/813,130

(22) Filed: Aug. 23, 2024

(65) Prior Publication Data

US 2024/0408565 A1　　Dec. 12, 2024

Related U.S. Application Data

(62) Division of application No. 17/394,818, filed on Aug. 5, 2021, now Pat. No. 12,102,975.

(Continued)

(51) Int. Cl.
*B01J 19/32*　　　(2006.01)
*B01D 53/86*　　　(2006.01)
(Continued)

(52) U.S. Cl.
CPC ......... *B01J 19/32* (2013.01); *B01D 53/8671* (2013.01); *B01D 53/92* (2013.01); *B01J 19/14* (2013.01);
(Continued)

(58) Field of Classification Search
CPC ......... B01J 19/32; B01J 9/14; B01D 53/8671; B01D 53/92; B01D 2219/322869; B01D 2219/3306; B64D 37/32
See application file for complete search history.

(56) References Cited

U.S. PATENT DOCUMENTS 7,905,259 B2　3/2011　Johnson et al.
10,745,145 B2　8/2020　Dardas et al.
(Continued)

FOREIGN PATENT DOCUMENTS

CN　　107913728 A　　4/2018
KR　20200089953 A　　7/2020

*Primary Examiner* — Elizabeth J Martin
(74) *Attorney, Agent, or Firm* — Renner, Otto, Boisselle & Sklar, LLP

(57)　　　　ABSTRACT

A sparging evaporator for an inerting system including an outer vessel, an inner vessel within the outer vessel, and a plenum formed between the inner and outer vessels. The outer vessel includes a gas inlet for receiving inlet gas into the plenum, and a liquid inlet for receiving liquid fuel into the plenum. The inlet gas in the plenum generates a gas pressure that is exerted against a free surface of the liquid fuel in the plenum thereby forcing the liquid fuel and the inlet gas through an inlet of the inner vessel. The inner vessel contains a lattice structure that promotes liberation of fuel vapor from the liquid fuel and enables the inlet gas in the liquid fuel to sparge the fuel vapor in the liquid fuel, thereby forming a fuel-enriched gas mixture that can be fed to a reactor of the inerting system.

15 Claims, 11 Drawing Sheets

Related U.S. Application Data

(60) Provisional application No. 63/062,067, filed on Aug. 6, 2020.

(51) Int. Cl.
| | |
|---|---|
| *B01D 53/92* | (2006.01) |
| *B01J 19/14* | (2006.01) |
| *B64D 37/32* | (2006.01) |

(52) U.S. Cl.
CPC ...... *B64D 37/32* (2013.01); *B01D 2259/4575* (2013.01); *B01J 2219/32286* (2013.01); *B01J 2219/32296* (2013.01); *B01J 2219/32408* (2013.01); *B01J 2219/3306* (2013.01)

(56) References Cited

U.S. PATENT DOCUMENTS

| | | | |
|---|---|---|---|
| 2008/0199376 A1* | 8/2008 | Limaye ................. | B64D 37/32 422/219 |
| 2020/0189761 A1 | 6/2020 | Emerson et al. | |

* cited by examiner

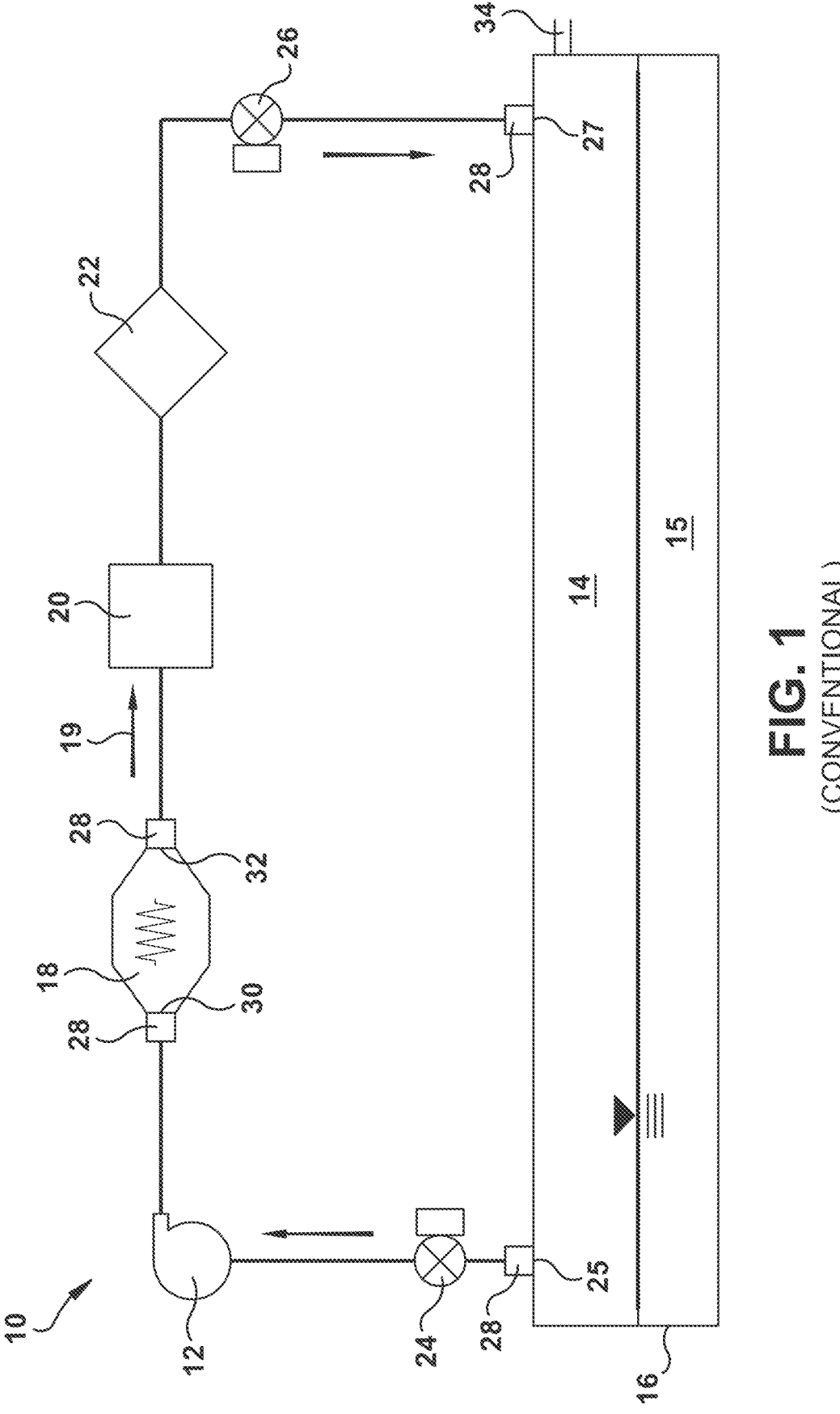
FIG. 1
(CONVENTIONAL)

FIG. 7

LATTICE STRUCTURE FOR SPARGING EVAPORATOR IN CATALYTIC INERTING SYSTEM

RELATED APPLICATIONS

This application is a divisional application of U.S. application Ser. No. 17/394,818 filed on Aug. 5, 2021, which claims the benefit of U.S. Provisional Application No. 63/062,067 filed Aug. 6, 2020, the contents of which are hereby incorporated by reference.

TECHNICAL FIELD

The present disclosure relates generally to inerting systems, more particularly to a catalytic inerting system (CIS) for an aircraft fuel tank, and even more particularly to a sparging evaporator for fuel enrichment in such catalytic inerting system.

BACKGROUND

The basic ullage-recirculating CIS architecture generally requires that ullage gas (the air and fuel vapor mixture that exists over the top of the liquid fuel in a fuel tank) be drawn from the fuel tank and reacted in a catalytic reactor. The catalytic process causes the reactive components present in the ullage gas (i.e., oxygen and fuel vapor) to chemically react and produce relatively inert, non-flammable chemical species, namely carbon dioxide ($CO_2$) and water vapor. Nitrogen, which typically is the component present in the greatest amount in the ullage gas, is an inert species and does not participate in the fuel vapor and air reaction that occurs in the catalytic reactor. The byproducts of the catalytic reaction and the nitrogen are all inert (non-flammable) and can be returned to the fuel tank to create an inert environment in the ullage. Because water is undesirable in the fuel tank, the water typically is removed from the inert gas stream before the gas stream is returned to the fuel tank.

Although the ullage space in the fuel tank will almost always contain fuel vapor in some concentration, this amount is typically below the so-called lower flammability limit (LFL) for tanks containing jet fuel or diesel fuel, and above the upper flammability limit (UFL) for fuel tanks containing gasoline. When the fuel vapor concentration in the ullage space is below the LFL, an insufficient quantity of fuel vapor exists in the ullage space to sustain a fire. When the fuel vapor concentration is above the UFL, the amount of fuel vapor present in the ullage is too great to sustain a fire. Fuels developed for automotive and aircraft applications are typically outside the so-called flammability window defined by the LFL and the UFL.

SUMMARY

The inerting performance of an inerting system is strongly related to the amount of fuel vapor introduced into the reactor for conversion to inert, non-flammable species (e.g., carbon dioxide and water). For example, if the fuel vapor composition is described by the hydrocarbon molecule $C_9H_{18}$, then the reaction equation is:

$$C_9H_{18} + 13.5\ O_2 \rightarrow 9\ CO_2 + 9\ H_2O$$

Assuming the reaction is limited by the quantity of fuel vapor molecules, then increasing the number of moles of fuel vapor introduced into the reactor will increase the number of moles of oxygen consumed, and thus increase the production of carbon dioxide and water. Ideally, the reactor would be provided with the maximum amount of fuel vapor while also staying just below the LFL during operation, thereby enabling the reactor to convert the maximum amount of available oxygen into the non-flammable inert byproducts. However, the fuel vapor content in the ullage gas (and therefore that which is introduced into the reactor) strongly depends on the temperature and pressure conditions, such as during flight, and may therefore vary significantly, thus degrading the inerting performance of the system. Accordingly, there is a need in the art to provide an inerting system that can supplement and/or control the fuel vapor content of the reactor's feed gas stream, such as when the ullage fuel vapor content decreases significantly, which may occur during low temperature conditions.

An aspect of the present disclosure provides an inerting system that improves upon the inerting performance of conventional ullage-recirculating inerting systems by providing a sparging evaporator that enriches the fuel vapor content of the reaction gas that is fed to the inerting system reactor.

More particularly, according to an aspect, the sparging evaporator disclosed herein receives a quantity of liquid fuel that is forced by an inlet gas through a sparging vessel in the evaporator, whereby fuel vapor liberated from the liquid fuel is swept away by the inlet gas to form a fuel-enriched gas mixture that is fed downstream to the reactor.

More specifically, according to an aspect, the sparging evaporator disclosed herein includes a lattice structure that enhances interactions of the liquid fuel, fuel vapor liberated from the liquid fuel, and inlet gas in such a way to form the fuel-enriched gas mixture. The exemplary lattice structure may be configured to enhanced one or more of mass transfer, heat transfer, mixing, and flow field uniformity, such as while optimizing for low pressure drop and/or minimizing physical size and weight of the evaporator.

According to a more specific aspect, the exemplary lattice structure may include two or more independent and spatially interlaced lattice structures. In exemplary embodiments, the spatially interlaced lattice structures are not in physical contact with each other through at least a portion of the flow domain of the evaporator. Such an interlaced solid body arrangement may provide enhanced balance between flow path tortuosity (such as to promote mixing), wetted surface area (such as to promote mass and heat transfer), and/or solid volume (such as to promote heat conduction and for calculating mass and overall size).

According to an aspect of the present disclosure, a sparging evaporator for a fuel tank inerting system includes: a vessel having at least one inlet for ingress of liquid fuel and an inlet gas, and having a gas outlet; and a lattice structure at least partially contained within the vessel, wherein the lattice structure includes a network of lattice members and nodes with voids formed between the lattice members and nodes; wherein the sparging evaporator is configured such that, when in use, the liquid fuel and the inlet gas enter the vessel via the at least one inlet and interact with the lattice structure, which promotes liberation of fuel vapor from the liquid fuel and enables the inlet gas to interact with and sweep away the fuel vapor to thereby form a fuel-enriched gas mixture, wherein the fuel-enriched gas mixture is carried downstream and exits the sparging evaporator via the gas outlet.

According to another aspect of the present disclosure, a sparging evaporator includes: an outer vessel, an inner vessel within the outer vessel, and a plenum formed between the inner and outer vessels, the outer vessel having a gas inlet for receiving inlet gas, and a liquid inlet for receiving liquid fuel, wherein both the gas inlet and the liquid inlet are in fluid communication with the plenum; the inner vessel having an inner vessel inlet and a gas outlet, wherein the inner vessel inlet is in fluid communication with the plenum; and a lattice structure at least partially contained within the inner vessel, wherein the lattice structure includes a network of lattice members and nodes with voids formed between the lattice members and nodes; wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet and through the lattice structure, the lattice structure being configured to promote liberation of fuel vapor from the liquid fuel and enable the inlet gas to interact with and sweep away the fuel vapor to thereby form a fuel-enriched gas mixture containing the inlet gas and the fuel vapor, wherein the fuel-enriched gas mixture is carried downstream and exits the sparging evaporator via the gas outlet.

According to another aspect of the present disclosure, a method of forming a sparging evaporator includes: providing or forming a fluid vessel having at least one inlet and at least one outlet; additively manufacturing a first lattice structure including a first network of lattice members and nodes with voids formed between the lattice members and nodes; and simultaneous with additively manufacturing the first lattice structure, additively manufacturing a second lattice structure including a second network of lattice members and nodes with voids formed between the lattice members and nodes, the first network of lattice members and nodes being interlaced with the second network of lattice members and nodes such that the first network of lattice members and nodes extends through the voids in the second network of lattice members and nodes; wherein the first lattice structure and the second lattice structure are at least partially contained within the vessel.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a schematic diagram of a conventional ullage-recirculating catalytic inerting system.

FIG. 7 is a two-dimensional side view of the lattice structure in FIG. 5 shown between two walls and with exemplary heat conduction paths depicted.

DETAILED DESCRIPTION

Figure 2:
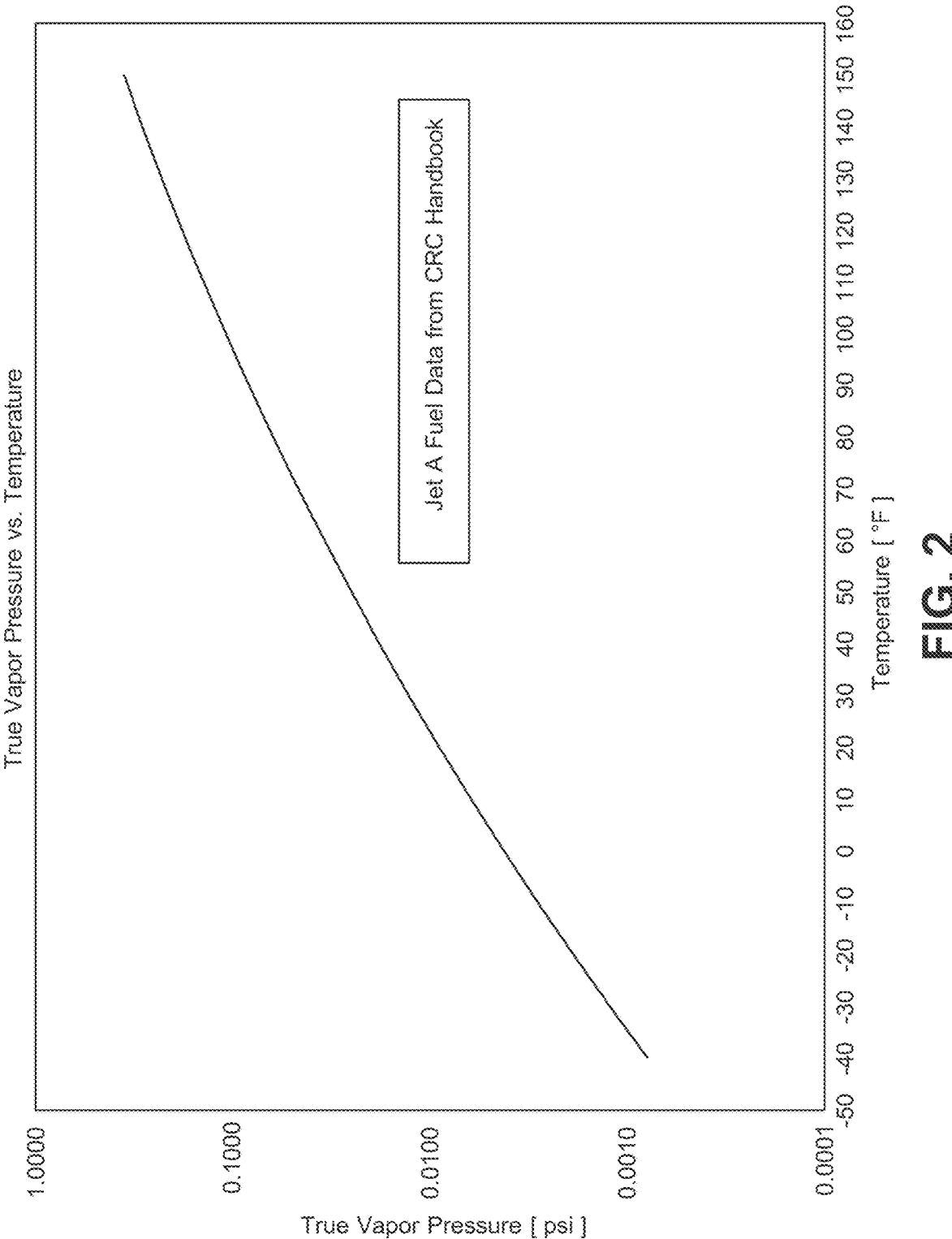
FIG. 2 is a chart plotting the true vapor pressure versus temperature for Jet A fuel.

The principles and aspects according to the present disclosure have particular application to ullage-recirculating catalytic inerting systems (CIS) for fuel tanks, and more specifically to an exemplary sparging evaporator for such systems, and thus will be described below chiefly in this context. It is understood, however, that principles and aspects according to the present disclosure may be applicable to other inerting systems generally, and may be applicable to a wide variety of applications, such as aerospace, automotive, industrial applications, and the like.

Referring to FIG. 1, an example of a conventional ullage-recirculating catalytic inerting system (CIS) 10 is shown. The conventional CIS 10 includes a closed-loop circuit that utilizes a blower 12 to draw ullage gas 14 from a fuel tank 16 into a catalytic reactor 18. The ullage gas 14 includes an air and fuel vapor mixture that exists over the top of the liquid fuel 15 in the fuel tank 16. The catalytic reactor 18 uses a catalytic reaction process that causes the flammable components present in the ullage gas 14 (i.e., oxygen and fuel vapor) to chemically react and produce relatively inert, non-flammable chemical species, namely carbon dioxide ($CO_2$) and water vapor. The ullage gas 14 also contains nitrogen, which typically is the component present in the greatest amount in the ullage gas 14. The nitrogen is inert and does not participate in the fuel vapor and air reaction that occurs in the catalytic reactor 18. The gaseous byproducts of the catalytic reaction and the nitrogen are all inert (non-flammable) and are then returned to the fuel tank 16 to create an inert environment in the ullage. An example of such a conventional CIS 10 is disclosed in U.S. Pat. No. 7,694,916, the contents of which are incorporated herein by reference.

As shown in FIG. 1, the conventional CIS 10 typically includes a heat exchanger 20 that is used to cool the inert (non-flammable) gas 19 exiting the reactor 18, and may include a condenser 22 that is used to condense at least some components of the gas 19, such as the water vapor, for facilitating removal thereof before the non-flammable gas 19 is returned to the fuel tank 16. An isolation valve 24 may be connected to a fluid line downstream of an outlet 25 of the fuel tank 16 to prevent flow of the ullage gas 14 into the CIS 10, and another isolation valve 26 may be connected to a fluid line upstream of an inlet 27 of the fuel tank 16 to prevent flow from the CIS 10 to the fuel tank 16. One or more flame arrestors 28 also may be provided at various locations of the circuit, such as at an inlet 30 and outlet 32 of the reactor 18, and/or at the outlet 25 and inlet 27 of the fuel tank 16. An ambient vent 34 may be provided in the fuel tank 16 to equilibrate pressure when exposed to super-atmospheric or sub-atmospheric conditions.

As discussed above, one problem with conventional catalytic inerting systems, such as the CIS 10 shown in FIG. 1, is that the fuel vapor content in the ullage gas 14 (and therefore that which is introduced into the reactor 18) depends on the temperature and pressure conditions, and therefore may vary significantly such as during flight. For example, the chart in FIG. 2 shows how a jet fuel's true vapor pressure varies with fuel temperature. In some cases, the quantity of fuel vapor (as determined by its vapor pressure) can vary by more than a factor of 10 across normal operating temperatures. Accordingly, because the reaction in the catalytic reactor 18 is strongly related to the amount of fuel vapor molecules contained in the ullage gas 14, the inerting performance of the CIS 10 will be negatively affected when the vapor pressure of the ullage gas stream 14 decreases, such as in low temperature conditions.

Figure 3:
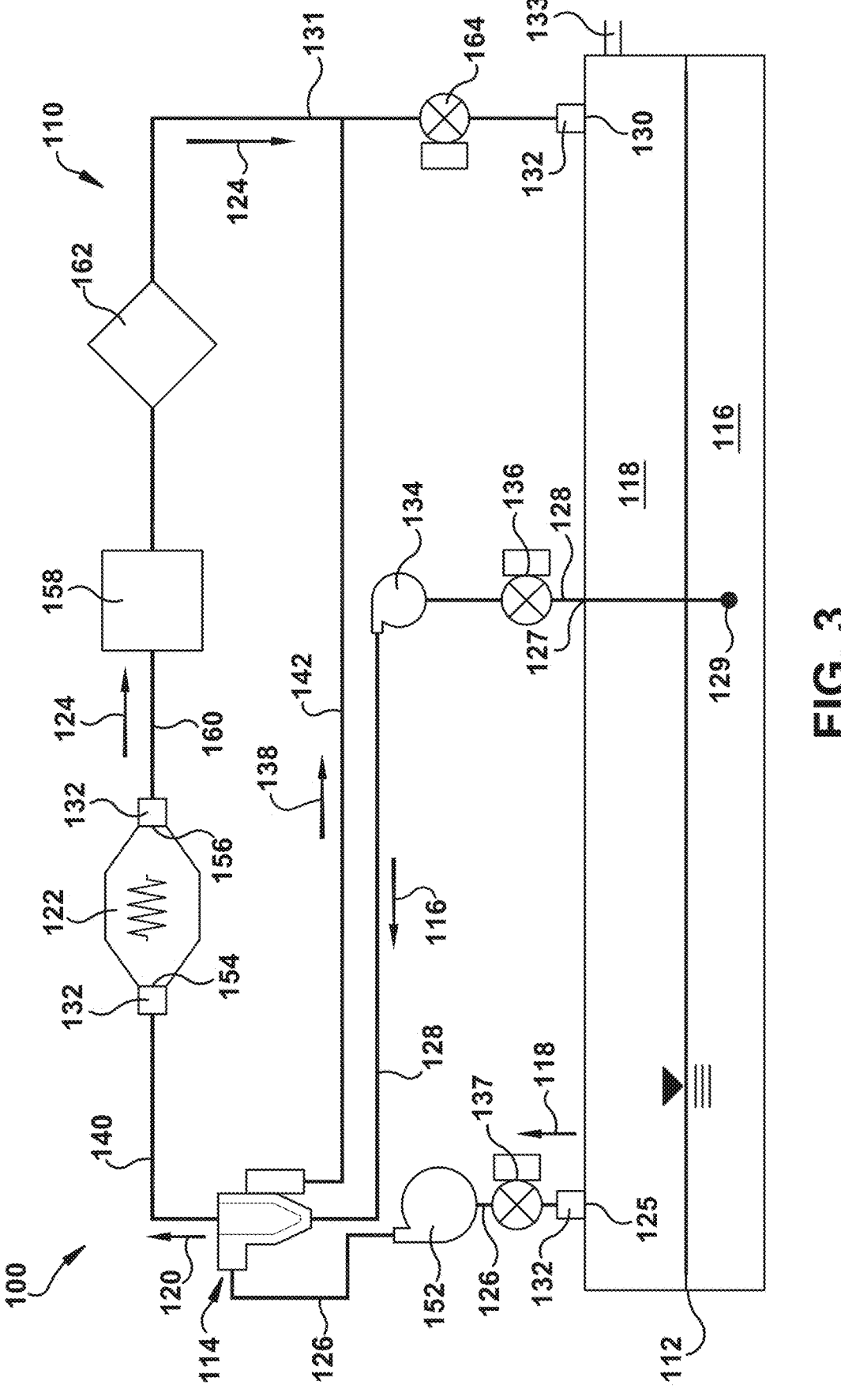
FIG. 3 is a schematic diagram of an exemplary inerting system according to an embodiment of the present disclosure.

FIG. 3 shows an exemplary embodiment of an inerting system 100 according to the present disclosure that improves upon the conventional ullage-recirculating catalytic inerting system 10. According to an aspect of the present disclosure, the inerting system 100 is configured to supplement the ullage gas from a gas tank with a quantity of additional fuel vapor, and this enriched gas mixture is then supplied into a reactor to thereby enhance the conversion of reactive species (e.g., fuel vapor and oxygen) in the gas mixture to inert, non-flammable species (e.g., carbon dioxide) that may then be returned to the fuel tank. The exemplary inerting system 100 may modify conventional inerting systems, such as the CIS 10, to provide such advantageous features; or the inerting system 100 may be specially constructed depending on the requirements of the application, as would be understood by those having ordinary skill in the art.

As shown in the illustrated embodiment, the exemplary inerting system 100 generally includes a fluid circuit 110 that is fluidly connectable to a fuel tank 112 via one or more fluid conduits or passages (shown schematically). An exemplary sparging evaporator 114 is fluidly connected in the fluid circuit 110 for receiving a flow of liquid fuel 116 from the fuel tank 112. The sparging evaporator 114 (also referred to herein as evaporator 114) is configured to volatilize at least a portion of the liquid fuel 116 to thereby form a volatilized fuel vapor. The evaporator 114 also is configured to receive a flow of inlet gas 118, and is configured to permit the inlet gas 118 to sweep away the volatilized fuel vapor downstream with the inlet gas 118 to form a fuel-enriched gas mixture 120 containing the inlet gas 118 and the volatilized fuel vapor. A reactor 122 is fluidly connected in the fluid circuit 110 downstream of the evaporator 114, and is configured to convert at least a portion of the fuel-enriched gas mixture 120 into an inert, non-flammable gas 124. The fluid circuit 110 is configured to supply at least some of the inert, non-flammable gas 124 generated by the reactor 122 to the fuel tank 112.

The fuel tank 112 may be any suitable fuel tank for the particular application. The fuel tank 112 may be a conventional fuel tank, such as the fuel tank 16 in the CIS 10. The fuel tank 112 includes a first outlet 125, such as an outlet port, to which an inlet gas supply conduit 126 of the circuit 110 is fluidly connected for supplying the inlet gas 118 to the evaporator 114. In the illustrated embodiment, the inlet gas 118 includes ullage gas in the head space of the fuel tank 112. In exemplary embodiments, the inlet gas 118 entering the evaporator 114 may contain other gas species, such as air from the ambient environment. The fuel tank 112 also includes a second outlet 127, such as an outlet port, to which a liquid fuel supply conduit 128 is fluidly connected for supplying the liquid fuel 116 to the evaporator 114. As shown, the liquid fuel supply conduit 128 extends toward a bottom of the fuel tank 112 and includes an inlet portion 129 for withdrawing the liquid fuel 116. The fuel tank 112 also includes an inlet 130, such as an inlet port, to which a gas return conduit 131 of the circuit 110 is fluidly connected for supplying the inert, non-flammable gas 124 to the fuel tank 112. Suitable flame arrestors 132 may be provided at the outlet 125 and the inlet 130. Generally, the fuel tank 112 is sealed to contain the ullage gas 118 in the tank. An ambient vent 133 also may be provided in the fuel tank 112 to equilibrate pressure when exposed to super-atmospheric or sub-atmospheric conditions, for example.

A pump 134 may be fluidly connected in the fluid circuit 110 for supplying the liquid fuel 116 to the evaporator 114. In the illustrated embodiment, the pump 134 is located in the liquid fuel supply conduit 128, although other locations are possible. The pump 134 may be any suitable fuel pump for supplying the desired amount of liquid fuel to the evaporator 114. The pump 134 may provide a constant pressure and/or constant flow rate of the liquid fuel; or the pump 134 may provide a variable pressure and/or variable flow rate of the liquid fuel. A controller (not shown) may be operably coupled to the pump 134 for controlling the desired pressure and/or flow rate, for example. Alternatively, the liquid fuel 116 could be gravity fed to the evaporator 114 without a pump 134. As shown, a valve 136, such as an isolation valve or flow control valve, may be provided in the liquid fuel supply conduit 128 downstream of the fuel tank 112 to control or prevent flow of the liquid fuel 116 into the circuit 110.

The evaporator 114 is fluidly connected in the fluid circuit 110 for receiving the liquid fuel 116 and the inlet gas 118. In the illustrated embodiment, for example, the evaporator 114 is fluidly connected to the liquid fuel supply conduit 128 and the inlet gas supply conduit 126. As shown, a valve 137, such as an isolation valve or flow control valve, may be provided in the inlet gas supply conduit 126 downstream of the fuel tank 112 to control or prevent flow of the inlet gas 118 into the circuit 110. As mentioned above, the evaporator 114 is configured to receive a flow of the inlet gas 118 and a flow of the liquid fuel 116, and is configured to liberate, or volatilize, fuel vapor from the liquid fuel 116 to permit the inlet gas 118 to sweep away the liberated or volatilized fuel vapor downstream with the inlet gas 118 as the fuel-enriched gas mixture. As shown, the evaporator 114 is fluidly connected to a reactor supply conduit 140 downstream of the evaporator 114 and upstream of the reactor 122 for supplying the fuel-enriched gas mixture 120 to the reactor 122. In exemplary embodiments, the unevaporated or non-volatilized liquid fuel 138 is permitted to return to the fuel tank 112 via a liquid fuel return passage 142, which in the illustrated embodiment is fluidly connected to the gas return conduit 131. Further details of the exemplary sparging evaporator 114 are described below in connection with FIGS. 4 and 5.

In the illustrated embodiment, the system 100 includes a blower 152 fluidly connected in the fluid circuit 110 for moving the fuel-enriched gas mixture 120 downstream toward the reactor 122. The blower 152 also may move the inlet gas 118 from the fuel tank 112 to the evaporator 114.

The blower 152 may be any suitable blower for moving the gas(es) in the fluid circuit 110. For example, the blower 152 may be a conventional blower, such as the blower 12 in the CIS 10. The blower 152 may be located at any suitable position in the fluid circuit 110 for providing a suction force and/or a blowing force of the gases in the circuit 110. For example, in the illustrated embodiment, the blower 152 is located upstream of the evaporator 114 for drawing the inlet gas 118 out of the fuel tank 112 (and/or ambient environment) and pushing the inlet gas 118 downstream into the evaporator 114.

The reactor 122 is fluidly connected in the fluid circuit 110 downstream of the evaporator 114, and is configured to convert the reactive gas components of the fuel-enriched gas mixture 120 (e.g., oxygen and fuel vapor) into inert, non-flammable gas components (e.g., water and carbon dioxide) in the reacted gas 124. The fuel-enriched gas mixture 120 also may contain nitrogen from the inlet gas 118, which may not participate in the reaction of the reactor 122, and thus may pass through as an inert component in the reacted inert, non-flammable gas 124. In exemplary embodiments, the reactor 122 is a catalytic reactor 122 that causes a catalytic reaction of the fuel-enriched gas mixture 120 for conversion thereof. The catalytic reactor 122 may be a conventional catalytic reactor, such as the reactor 18 in the CIS 10, which may include a heated catalyst bed having catalytic materials that are well-known in the art. Alternatively, the reactor 122 may be another type of reactor, or a reactor specially designed for converting the fuel-enriched gas mixture 120. As shown, flame arrestors 132 may be included on an inlet 154 and outlet 156 of the reactor 122.

A heat exchanger 158 may be fluidly connected in the fluid circuit 110 downstream of the reactor 122 for cooling the reacted inert, non-flammable gas 124. As shown, the heat exchanger 158 is fluidly connected to a reactor exhaust conduit 160 that is connected to the reactor outlet 156. The heat exchanger 158 may be any suitable heat exchanger well-known in the art, such as the heat exchanger 20 in the CIS 10. The heat exchanger 158 may be a plate-fin heat exchanger, for example, having cooling air channels in fluid communication with the outside air.

A condenser 162 may be fluidly connected in the fluid circuit 110 downstream of the heat exchanger 158 for condensing at least some components of the inert, non-flammable gas 124, such as the water vapor. The condenser 162 may be any suitable condenser well-known in the art, such as the condenser 22 in the CIS 10. The condenser 162 may include a drain conduit (not shown) for facilitating removal of the condensed water vapor from the gas 124, thereby preventing water from entering the fuel tank 112.

As shown, a valve 164, such as an isolation valve or flow control valve, may be provided in the return conduit 131 upstream of the fuel tank 112 to prevent flow through the circuit 110. In the illustrated embodiment, the liquid return conduit 142 is connected to the inert, non-flammable gas return conduit 131 upstream of the valve 164. In the system 100, the non-volatilized liquid fuel 138 will flow from the evaporator 114 via the liquid return conduit 142, then flow back into the fuel tank 112 through the valve 164 and gas return conduit 131. The pressure gradient inherent in the system 100 will tend to drive the non-volatilized liquid fuel 138 through the bypass return conduit 142 and into the gas return conduit 131. At this location, the inert, non-flammable gas 124 is flowing down to the ullage space of the tank 112, so the non-volatilized liquid fuel 138 will be urged downstream along with the inert, non-flammable gas 124. Additionally, the system 100 can be completely isolated from the ullage when the isolation valves 137, 164 are closed.

In exemplary embodiments, the inerting system 100 may be substantially the same as or substantially similar to the inerting system 600 shown and described in Applicant's co-pending International Application No. PCT/US2019/59646 filed Nov. 4, 2019, which is incorporated herein by reference in its entirety. It is understood that the exemplary sparging evaporator 114 described herein may be utilized in any of the exemplary inerting systems 100, 200, 300, 400, 500, 600, 700 or 800 described in International Application No. PCT/US2019/59646, as would be understood by those having ordinary skill in the art.

Figure 4:
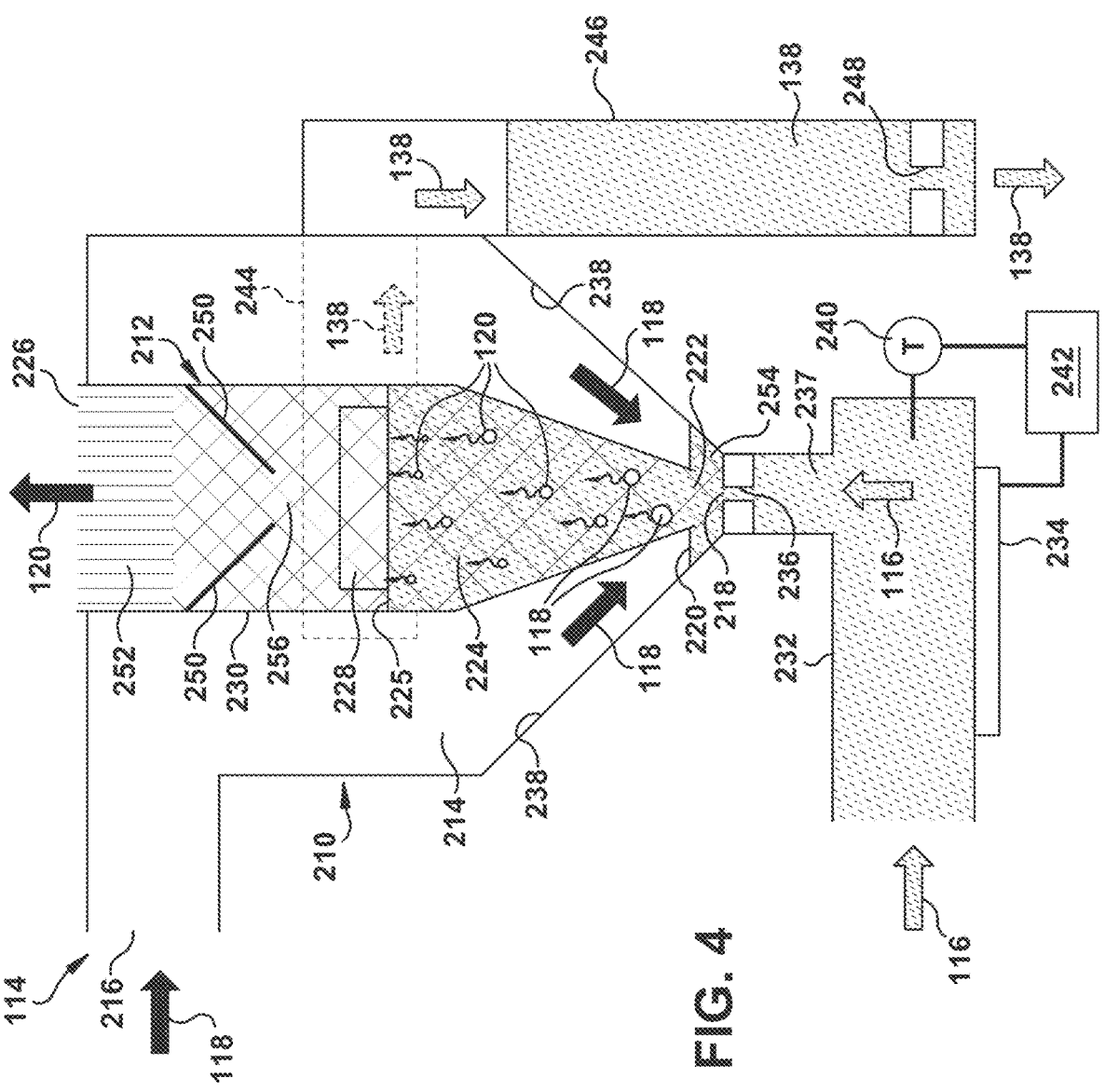
FIG. 4 is a schematic cross-sectional side view of an exemplary sparging evaporator according to an embodiment of the present disclosure that may be used in the inerting system in FIG. 3.

Referring to FIG. 4, an exemplary embodiment of the sparging evaporator 114 is shown. The sparging evaporator 114 generally includes an outer vessel 210, an inner vessel 212 within the outer vessel 210, and a plenum 214 formed between the outer and inner vessels 210, 212. The outer vessel 210 includes a gas inlet 216 for receiving the inlet gas 118 into the plenum 214, and a liquid inlet 218 for receiving liquid fuel 116 into the plenum 214. The inlet gas 118 in the plenum 214 generates a gas pressure that is exerted against a free surface 220 of the liquid fuel 116 in the plenum 214 thereby forcing the liquid fuel 116 and the inlet gas 118 through an inlet 222 of the inner vessel 212. As shown, the inner vessel 212 contains a lattice structure 224 within the inner vessel 212 that is configured to promote liberation of the fuel vapor from the liquid fuel 116, and which enables the inlet gas 118 in the liquid fuel 116 to interact with and sparge the fuel vapor in the liquid fuel 116, thereby forming the fuel-enriched gas mixture 120 containing the inlet gas 118 and the fuel vapor. The fuel-enriched gas mixture 120 is carried downstream and exits the sparging evaporator 114 via a gas outlet 226 of the inner vessel 212. As shown in the illustrated embodiment, the liquid fuel 116 in the inner vessel 212 can be drained via a liquid outlet 228 of the inner vessel 212.

In exemplary embodiments, the gas inlet 216 of the outer vessel 210 is connected to the inlet gas supply conduit 126 of the inerting system 100 to receive the flow of the inlet gas 118. The inlet gas 118 may contain the ullage gas from the fuel tank 112, as shown and described above. Alternatively or additionally, the inlet gas 118 may contain another gas, such as air, which may be drawn from the ambient environment, for example. As shown, the gas inlet 216 may be ported at an upper portion of the outer vessel 210 such that the inlet gas 118 forms a head pressure on the liquid fuel 116. In the illustrated embodiment, an outer surface 230 of the inner vessel 212 forms a barrier, or wall, that defines a portion of the plenum 214 and forces the inlet gas 118 and liquid fuel 116 to enter the inner vessel 212 via the inlet 222 at a lower portion of the inner vessel 212.

In the illustrated embodiment, the liquid inlet 218 is at a lower portion of the outer vessel 210, which facilitates collection of the liquid fuel 116 in the bottom portion of the plenum 214 and facilitates drainage of the liquid fuel 116 when the sparging evaporator 114 is not in use. As shown, the liquid inlet 218 may be fluidly connected to a fuel feed passage 232, such as a channel or rail, which may be used in exemplary embodiments to preheat the liquid fuel 116 with a heater 234 prior to entering the plenum 214, as described in further detail below. In exemplary embodiments, the fuel feed passage 232 (also referred to as fuel feed channel 232) is fluidly connected to the liquid fuel supply conduit 128 of the inerting system 100 to receive the flow of liquid fuel 116 from the fuel tank 112 as described above. As shown, a flow orifice 236 may be provided in an inlet passage 237 upstream of the liquid inlet 218 to the plenum 214. In the illustrated embodiment, the flow orifice 236 provides a flow metering function to control the amount of liquid fuel 116 entering the plenum 214. In exemplary embodiments, the flow orifice 236 is a fixed restriction orifice that provides passive metering of flow into the plenum 214. In alternative embodiments, the flow orifice 236 may be actively controlled via a suitable valve to control flow. In some embodiments, the pump 134 of the inerting system 100 is a positive displacement fuel pump that is adjustable to provide the desired flow rate of liquid fuel 116 to the evaporator 114, although other suitable pumps may be employed.

As shown in the illustrated embodiment, each of the outer vessel 210 and inner vessel 212 is configured with a funnel shape, such as a cone, that promotes collection of the liquid fuel 116 toward a bottom portion of the respective vessels 210, 212. Because the inner vessel inlet 222 is located proximate to the bottom portion of the funnel shape of the outer vessel 210, any changes in the relative angle between the free surface 220 and the inlet to the inner vessel 222 due to the inertia loads imposed by flight maneuvers of the aircraft will still allow the liquid fuel 116 to collect around the inner vessel inlet 222 due to the tapered walls 238 of the outer vessel 210. The funnel shape of the respective outer and inner vessels 210, 212 also permits the liquid fuel 116 to drain back through the fuel feed channel 232 when the evaporator 114 is not in use to prevent fuel from accumulating in the evaporator 114.

As discussed briefly above, when the evaporator 114 is in use, the inlet gas 118 entering the plenum 214 via the gas inlet 216 generates a gas pressure within the plenum 214 that is exerted against the free surface 220 of the liquid fuel 116 in the plenum 214. The gas pressure exerted against the free surface 220 is greater than the hydrostatic pressure of the liquid fuel 116 at the free surface 220 that has passed through the flow control orifice 236, such as via the pump 134. Accordingly, the inlet gas 118 in the plenum 214 pushes the level of the free surface 220 downwardly in the plenum 214, which causes the liquid fuel 116 to be forced upwardly into the inner vessel 212 via the inlet 222. As shown, the level of the free surface 220 of the liquid fuel 116 is pushed downwardly until it becomes nearly level with the inner vessel inlet 222. The gas pressure will continue to push the free surface level of the liquid fuel 116 down slightly below the inner vessel inlet 222 until the inlet gas 118 can escape through the inlet 222 and bubble up through the liquid fuel 116 contained in the inner vessel 212. Such inlet gas 118 bubbling up through the inner vessel 212 will interact with the fuel vapor liberated from the liquid fuel 116 in the inner vessel 212, such that the inlet gas 118 sweeps the fuel vapor downstream toward the gas outlet 226 as the fuel-enriched gas mixture 120 containing the inlet gas 118 and fuel vapor.

In exemplary embodiments, the fuel vapor will volatilize or evaporate into the gas/air space at a free surface 225 of the liquid fuel 116 in the inner vessel 212, on the surfaces of structures above the free surface 225 in the inner vessel 212 (e.g., structure 256, described below), and/or across the free surface that exists on the bubbles of inlet gas 118 that are flowing through the liquid fuel 116 in the inner vessel 212. In this manner, the fuel vapor is expected to generally liberate from the liquid fuel 116 at the interface between the liquid fuel 116 and a gas (e.g., inlet gas 118 or fuel-enriched gas vapor 120). In this way, the bubbles of inlet gas 118 entering the liquid fuel 116 in the inner vessel 112 initially may contain essentially all inlet gas when entering the inner vessel 112, and this gas will become progressively richer with fuel vapor until the fuel-enriched gas mixture 120 exits the device.

The lattice structure 224 contained within the inner vessel 212 is configured to promote liberation of the fuel vapor from the liquid fuel 116, and is configured to enable the inlet gas 118 in the liquid fuel 116 to interact with and sparge the fuel vapor in the liquid fuel 116 to thereby form the fuel-enriched gas mixture 120. Generally, the lattice structure 224 is located between at least between the inlet 222 and the gas outlet 226 of the inner vessel 212, such as between the inlet 222 and liquid outlet 228 to promote sparging within this interaction zone, but may extend to other regions to provide other functionality, as described in further detail below. In exemplary embodiments, the lattice structure 224 is configured to facilitate liberation (e.g., volatilization) of the lower molecular weight components of the liquid fuel 116 to form the fuel vapor, while the higher molecular weight components remain in a liquid state as the non-volatilized liquid fuel 138. Such separation of the volatilized fuel vapors from the non-volatilized liquid fuel 138 may enable separation of contaminants that may affect the performance of the reactor 122. Such contaminants tend to be heavier and less volatile than the lighter ends of the liquid fuel 116 that are volatilized by heating in the evaporator 114. Therefore, the volatilized fuel vapors may inherently contain less contaminants than the unevaporated liquid fuel 138, thereby improving the life of the reactor 122.

The lattice structure 224 may be any suitable lattice structure that interacts with fluid flow through the structure to improve interactions of the liquid fuel 116, fuel vapor liberated from the liquid fuel 116, and inlet gas 118 in such a way to form the fuel-enriched gas mixture 120. The exemplary lattice structure 224 may be configured to enhance one or more of mass transfer, heat transfer, mixing, and flow field uniformity, such as while optimizing for low pressure drop and/or minimizing physical size and weight of the evaporator 114. More particularly, in exemplary embodiments, the lattice structure 224 may have any suitable lattice structure configuration that promotes one or more of the following functions: (i) improved mixing performance for a given wetted area density; (ii) minimal pressure drop for a given wetted area density; (iii) expansion of flow over a relatively short linear distance, and output of a consistent and uniform flow field; (iv) efficient heat transfer between the solid lattice structure and the fluid; and (v) effective flame arresting functionality, which may be provided by— the labyrinth-like flow path which minimizes the distance between any location in the fluid medium and the surface of the lattice and effective heat transfer capability, for example.

Figure 5:
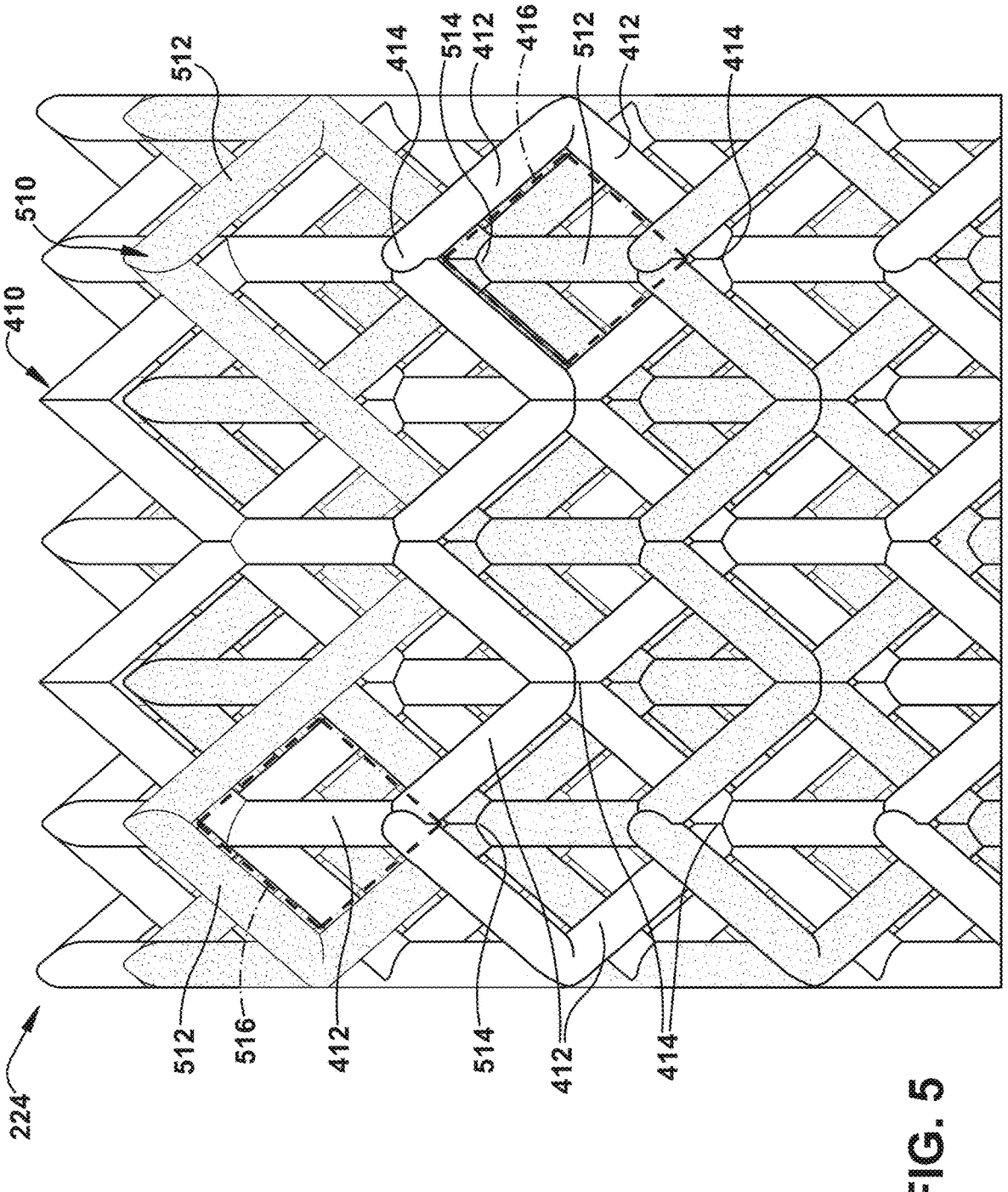
FIG. 5 is an enlarged three-dimensional side view of a portion of an exemplary lattice structure according to an embodiment of the present disclosure, which is used in the evaporator in FIG. 4.
Figure 6:
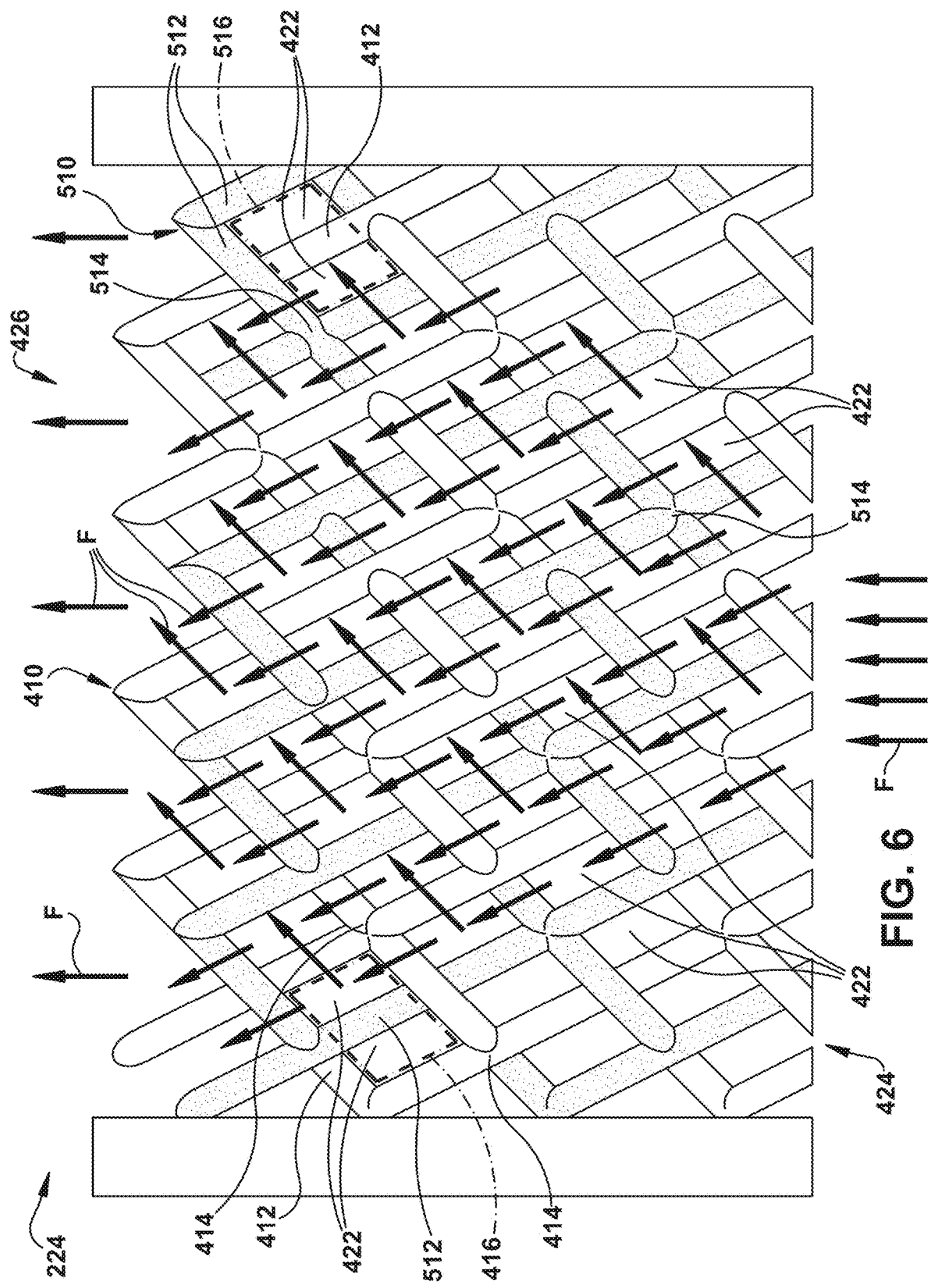
FIG. 6 is a two-dimensional side view of the lattice structure in FIG. 5 shown between two walls and with exemplary flow paths depicted.
Figure 7:
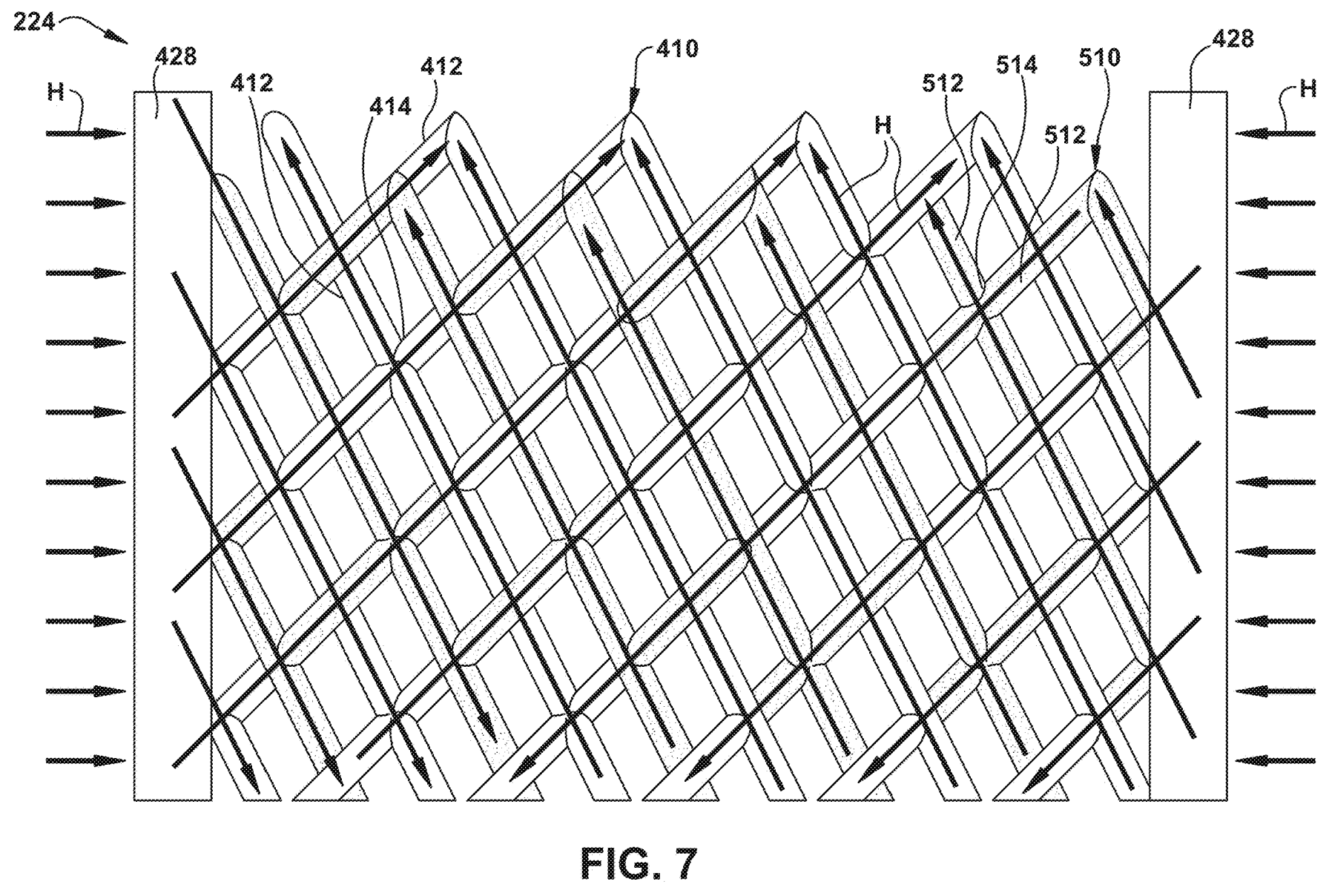

Referring to FIGS. 5-7, close-up views of a portion of the exemplary lattice structure 224 according to an embodiment is shown. In exemplary embodiments, the lattice structure 224 is an overall lattice structure 224 which may include one or more lattice structures 410, 510 that together form the overall lattice structure 224. As shown, each lattice structure 410, 510 may include a respective network or grid of lattice members 412, 512 and nodes 414, 514 with voids 416, 516 (shown with dot-dash lines) formed between the lattice members 412, 512 and nodes 414, 514. It is understood that although the exemplary overall lattice structure 224 includes two lattice structures 410, 510, the overall lattice structure 224 may include only one lattice structure 410 or 510, may include only the two lattice structures 410 and 510, or may include greater than two lattice structures, such as 3, 4, 5, 6, etc., or more lattice structures. The exemplary first lattice structure 410 will be described in further detail below, it being understood that the exemplary second lattice structure 510 or additional lattice structures may be configured substantially similar to the first lattice structure 410, or may be constructed differently.

Figures 8, 9, 10:
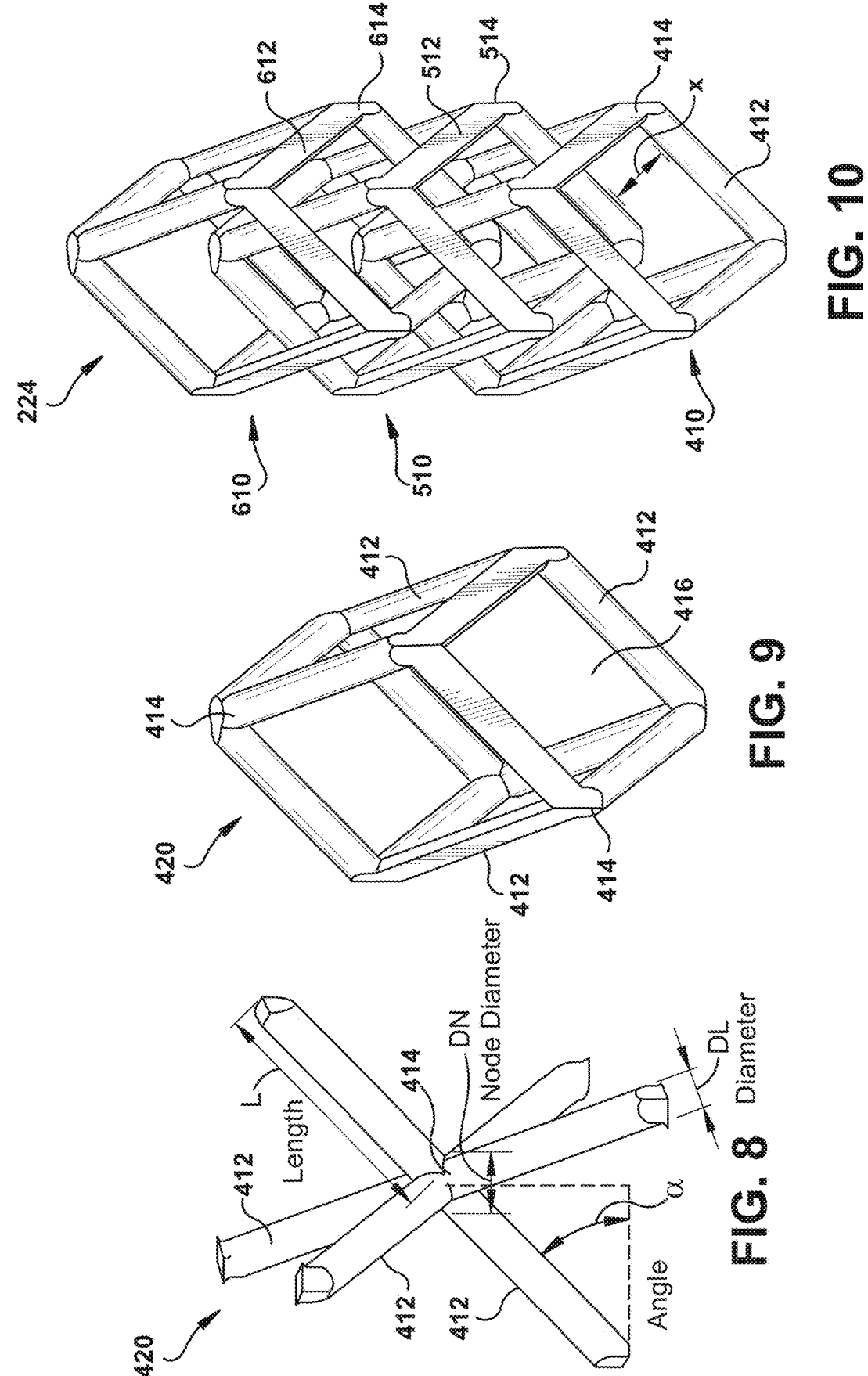
FIG. 8 is a three-dimensional view of an exemplary unit cell of the lattice structure about a node.
FIG. 9 is a three-dimensional view of an exemplary unit cell of the lattice structure about a pore.
FIG. 10 is an enlarged three-dimensional view of a portion of an exemplary structure including three exemplary interlaced lattice structures.

As shown in the illustrated embodiment, the lattice structure 410 is an open cell structure possessing a lattice topology defined by a plurality of interconnected cells. Each cell includes at least a portion of one of the nodes 414, and at least a portion of at least one of the lattice members 412 that extends from the node 414. In the illustrated embodiment, the cells are unit cells 420, which represents the minimum unique combination of nodes 414 and lattice members 412 containing the full symmetry of the lattice structure 410, and which the unit cells 420 spatially repeat to form at least part of the lattice structure 410. An exemplary illustration of a unit cell 420 centered around a node is shown in FIG. 8. An exemplary illustration of a unit cell 420 centered around void space is shown in FIG. 9. An exemplary illustration of a structure 224 including three different interlaced lattice structures 410, 510, and 610 with lattice members 612 and nodes 614 is shown in FIG. 10.

In exemplary embodiments, the entire lattice structure 410 is provided as a periodic cellular structure having a repeating pattern of the unit cells 420 across the entire structure. Alternatively, the lattice structure 410 as a whole may be provided as a stochastic cellular structure, which has random variations in the shape and size of the cells 420. In some embodiments, one or more portions of the lattice structure 410 may have a periodic cellular structure and one or more portions of the lattice structure 410 may have a stochastic structure. In some embodiments, one portion of the lattice structure 410 may have a first periodic cellular structure and a second portion of the lattice structure 410 may have a second different periodic structure. More than two such different periodic structures may be provided in the lattice structure 410, such as to provide a gradient structure for example (as shown in FIG. 9, for example, and described in further detail below). The second lattice structure 510, or additional lattice structures, may be constructed similarly to the first lattice structure 410 to have one or more periodic and/or one or more stochastic structures, or the like. Likewise, the overall lattice structure 224 may be constructed similarly to have one or more periodic and/or one or more stochastic structures, or the like.

The nodes 414 are the portions of the lattice structure 410 where the lattice members 412 connect together. Accordingly, the nodes 414 may be constructed as any suitable joint or other vertices. In the illustrated embodiment, the nodes 414 are unitary with the lattice members 412. As shown in the illustrated embodiment, the nodes 414 are disposed at selected locations throughout the lattice structure 410. By way of example, the nodes 414 form an array, with the nodes 414 generally organized into columns and/or rows. The nodes 414 of adjacent rows/columns may be aligned or may be offset relative to each other.

The lattice members 412 are the structural members that maintain the shape of the lattice structure 410 and cooperate with the nodes 414 to form the voids 416. The lattice members 412 may have any suitable configuration for the desired function. For example, the lattice members 412 may be formed as rods, bars, strips, struts, wires, beams, extensions, or the like. The lattice members 412 may extend in any suitable three-dimensional direction, and may be straight, bent, curved, any combination thereof, or the like. The cross-section of the lattice members 412 may be any cross-section or combination of cross-sections suitable for the intended purpose. The lattice members 412 may be solid or hollow.

In exemplary embodiments, a plurality of the lattice members 412 are oriented in spaced relation about a single node 414. Accordingly, adjacent lattice members 412 on a node 414 are angularly spaced from each other about a node perimeter. A node 414 may include any number of lattice members 412 as may be desired for the particular application. By way of example, a cell 420 may include two, three, four, five, six or more lattice members 412. The nodes 414 at or near the outer perimeter of the lattice structure 410 may have fewer lattice members 412 than the nodes 414 further inward of the lattice structure 410.

In the illustrated embodiment, the lattice members 412 are formed as solid rods having a circular cross-section and which extend linearly from one node 414 to another adjacent node 414. As shown, some lattice members 412 extend in a vertical direction; whereas other lattice members 412 are inclined relative to the vertical direction. In the illustrated embodiment, the nodes 414 in the outermost column at the perimeter have three lattice members 412 extending therefrom, and the nodes 414 that are in rows inwardly spaced from the perimeter have five lattice members 412. As shown, the lattice members 412 are angularly spaced apart from each other about the node 414 to extend in different directions. By way of example and not limitation, as shown in FIG. 8, the nodes 414 may possess a diameter DN from about 0.015-inches to about 0.150-inches; the lattice members 412 may possess a diameter DL from about 0.010-inches to about 0.100-inches and a length of about 0.040-inches to about 0.250-inches; the lattice members 412 may be at an angle a in a range from 20-degrees to 60-degrees, such as about 45-degrees; and the voids 416 may possess a size or diameter about the length of the lattice members, such as from about 0.040-inches to about 0.250-inches. In the illustrated embodiment, the second lattice structure 510 has been constructed identically as the first lattice structure 410, except with the nodes 514 offset vertically and horizontally relative to the nodes 414. As shown in FIG. 10, a distance (X) between lattice members 412, 512 may be in the range from 0.003-inches to about 0.100-inches, for example.

As discussed above, the voids 416 are formed between the nodes 414 and lattice members 412. The voids 416 may have any suitable configuration for the desired function. In some embodiments, the voids 416 form pores of the lattice structure 410 and/or overall lattice structure 224. In exemplary embodiments where the voids 416 are intersected with other structures, such as the lattice members 512 of lattice structure 510, the pores are formed by the volumes of spaces between respective portions of the structure. In the illustrated embodiment, for example, pores 422 are formed by the interstitial volumes of space between respective first lattice members 412, second lattice members 512, first nodes 414 and second nodes 514 (as best shown in FIG. 6, for example). In this manner, the pores 422 are shared between the lattice members 410, 510. Generally, the overall lattice structure 224 is a porous structure in which the pores (e.g., 422) of the structure 224 are the empty regions between respective spaced apart portions of the structure 224.

As shown, the pores 422 of the structure 224 form passages between the respective spaced apart portions of the structure 224. Generally, the pores 422 of adjacent cells 420, 520 are interconnected with each other to form a plurality of flow paths through the lattice structures 410, 510 and the overall lattice structure 224, which allows fluid (e.g., the liquid fuel 116, fuel vapor, inlet gas 118 and/or fuel-enriched gas mixture 120) to flow through the lattice structure 224. In exemplary embodiments, the structure 224 has a network of interconnected (open) pores 422 that form tortuous flow paths for the fluid flowing through the structure 224. The pores 422 of the structure 224 may be stochastic (e.g., randomly dispersed) or uniformly arranged (e.g., periodic) across the structure 224.

The particular configurations of the nodes 414, 514, lattice members 412, 512, and/or voids 416, 516 may be selected as desired for the purpose of the relevant component. In exemplary embodiments, the overall lattice structure 224 is configured to provide one or more of the following functions in the evaporator 114: (i) enhanced mass transfer (e.g., volatilization/evaporation of the liquid fuel 116); (ii) enhanced heat transfer; (iii) enhanced mixing; (iv) enhanced sparging; (v) enhanced flow diffusion; (vi) enhanced fluid flow control; and (vii) enhanced flame arresting functionality. It is understood that the foregoing functions are not limiting, and the lattice structure 224 may provide other suitable functionality for the desired application, as would be understood by those having ordinary skill in the art.

Referring particularly to FIG. 5, the relatively high surface area of the overall lattice structure 224 is shown. In the illustrated embodiment, the lattice structure 224 has a high surface area due, at least in part, to the relatively high porosity of the lattice structure 224. In exemplary embodiments, the high surface area of the porous lattice structure 224 provides for enhanced mass transfer (e.g., evaporation) of the liquid fuel 116 by enabling more solid surface area for wetting and thereby greater liberation of the fuel vapors. In exemplary embodiments, the porosity of the lattice structure 224 helps to draw the liquid fuel 116 up into the inner vessel 212 through capillary action and wet out the surfaces (e.g., lattice members 412, 512 and nodes 414, 514) of the lattice structure 224 that form the pores 422. When heated or otherwise energized, these surfaces promote liberation of the fuel vapors, thereby providing a high-degree of fuel vapor generation. This, in turn, at least partially contributes to the enhanced sparging functionality of the lattice structure 224 as the inlet gas 118 (e.g., bubbles, including the progressively fuel-enriched bubbles) interacts with these surfaces to liberate and capture the fuel vapors to form the fuel-enriched gas mixture 120 that is carried downstream.

The overall porosity of the structure 224 is the aggregate volume of all the pores 422 in the structure 224 divided by the overall volume of the lattice structure 224, which is defined in terms of open volume over total volume. In exemplary embodiments, the lattice structure 224 may have a porosity in the range from 50% to 90% (open volume/total volume), more particularly in the range from 58% to 80% (open volume/total volume), such as 50%, 55%, 60%, 65%, 70%, 75%, 80%, 85% or 90% porosity. In exemplary embodiments, the size of the pores (e.g., spaces between surfaces of the lattice structure 224) may be in a range from about 0.01 inches to about 0.2 inches, for example, such as 0.01, 0.02, 0.06, 0.1, 0.15, or 0.2 inches, including all ranges and subranges between the stated values.

Referring particularly to FIG. 6, the enhanced flow diffusion functionality of the lattice structure 224 is shown via the fluid flow arrows, F. As shown in the illustrated embodiment, a narrow jet of fluid (e.g., liquid fuel 116, inlet gas 118, and/or fuel vapor) enters an upstream side 424 of the lattice structure 224. As shown, the configuration of the lattice members 412, 512 and nodes 414, 514 form the interconnected pores 422 of the lattice structure 224, which provide relatively small and/or tortuous flow paths for the fluid F. In this manner, the lattice structure 224 essentially serves as a flow restrictor to the fluid (e.g., liquid fuel 116, inlet gas 118, and fuel vapor) flowing thereacross. This restriction enables a rapid expansion (via diffusion) of the fluid in a relatively short distance along the flow path. The fluid (e.g., fuel-enriched gas mixture 120) that is discharged at the downstream end 426 of the lattice structure 224 has a relatively uniform velocity profile as it exits the lattice structure 224. Referring again to FIG. 4, the inlet 222 of the inner vessel 212 where the fluid (e.g., liquid fuel 116 and inlet gas 118) enters the lattice structure 224 is relatively small compared to the downstream side of the lattice structure 224 which also enables the expansion of the fluid. In exemplary embodiments, the expansion ratio-the ratio of the outlet cross-sectional area to the inlet cross-sectional area-may be in the range of 2:1 up to 40:1.

Also as shown in FIG. 6, the enhanced mixing functionality provided by the lattice structure 224 is evident by the fluid flow arrows, F, as the fluid travels through the interconnected network of pores 422. As shown in the illustrated embodiment, the configuration of the lattice members 412, 512; nodes 414, 514; and pores 422 provide tortuous and/or intersecting fluid flow paths which promotes mixing of the fluid. In this manner, the lattice structure essentially serves as a mixing structure (e.g., static mixer) that agitates the liquid fuel 116 as the liquid fuel is forced through the lattice structure 224. Such a mixing structure also promotes agitation of the bubbles of the inlet gas 118 (including progressively fuel-enriched bubbles 120) in the liquid fuel 116, which may reduce bubble size and increase surface area, and may better disperse the bubbles, thereby enhancing the sparging effect.

Referring to 7, the enhanced heat transfer functionality of the lattice structure 224 is shown via the heat conduction arrows, H. As shown, the lattice structure 224 transfers heat to the liquid fuel 116 to promote liberation of the fuel vapors by volatilization. In exemplary embodiments, the lattice structure (e.g., heat-transfer structure) is in thermal communication with a suitable heater, such as the heater 234, for example. To help facilitate such heat transfer, the lattice structure 224 may be in direct contact with the walls of the inner vessel 212, or may be integrated into the inner vessel 212, and also may be in direct contact with or integrated into the outer vessel 210. Where the lattice structure 224 provides mixing functionality in combination with heat-transfer functionality, such mixing while heating may promote heat transfer and volatilization of the fuel vapors by enhancing the turbulence of the fluid flow.

In exemplary embodiments, the lattice members 412, 512 are unitary with the nodes 414, 514 to provide continuous heat conduction paths across the lattice structure 224. As shown in the illustrated embodiment, the heat conduction paths may extend across an entirety of the lattice structure 224. In exemplary embodiments, the lattice members 412, 512 and/or nodes 414, 514 are unitary with one or more of the walls 428, which may be walls of the inner vessel 212 and/or outer vessel 210. This may include the side walls, upper walls, lower walls, or the like. Such a unitary construction maximizes heat conduction by minimizing thermal contact resistance. This, in turn, enhances promoting the volatilization of the fuel vapors and thereby the sparging effect.

The material or combination of materials forming the lattice structure 410, the second lattice structure 510, and/or the overall lattice structure 224 (including any additional lattice structures) may be high thermal conductivity materials (e.g., greater than about 10 W/m-K, more particularly greater than about 50 W/m-K, or greater than 100 W/m-K), such as suitable metals. In exemplary embodiments, the lattice structures 410, 510 and/or 224 (including any additional lattice structures) are made with light-weight materials, such as aluminum alloys, for example. For example, the lattice structure 224 may include or be made from an alloy of aluminum, such as $AlSi_{10}Mg$ having a thermal conductivity in the range from 103 to 190 W/m-K. Alternatively or additionally, other materials suited to high temperature applications, such as stainless steel or Inconel, could be employed, which may require a higher heat flux from the heat source. Generally, the material(s) should be capable of withstanding the fuel-enriched environment at elevated temperatures.

In exemplary embodiments, the first lattice structure 410 may be made with a different material than the second lattice structure 510, or the materials of the lattice structures 410, 510 may be the same. For example, the first lattice structure 410 may be made with a first material having a different thermal conductivity than that of a second material of the second lattice structure 510. Such varying thermal conductivities may enable better balancing of overall thermal conductivity of the lattice structure 224 with weight savings, while still providing desired fluid flow performance, for example. More generally, the ability to vary the materials of the lattice structures 410 and 510 (or additional lattice structures) enhances the tailorability of the evaporator design. It is understood that these examples are not intended to be limiting, and the lattice structures, 410, 510 and/or 224 may be made of any suitable material or combination of materials in any suitable configuration as would be understood by those having ordinary skill in the art.

As noted above, the exemplary lattice structure 224 may provide additional functionality, such as flame arresting functionality and/or improved control over the fluid. For example, the porosity provided by the lattice structure 224 may help to restrict fuel splashing by capturing liquid fuel droplets, and may also help to capture bubbles in the liquid fuel 116, which helps to prevent these constituents from being discharged downstream through the gas outlet 226 toward the reactor. In addition, the pores 422 of the lattice structure 224 may minimize the distance between a possible flame front and heat sink to provide flame arresting functionality. It is understood that the foregoing functions of the lattice structures 410, 510 and/or 224 are not intended to be limiting, and that other functions may be provided for particular applications, as would be understood by those having ordinary skill in the art.

Referring again particularly to FIG. 5, in exemplary embodiments the first network of lattice members 412 and nodes 414 are interlaced with the second network of lattice members 512 and nodes 514 such that the first network of lattice members 412 and nodes 414 extends through the voids 516 in the second network of lattice members 512 and nodes 514, and vice versa. As a result, respective portions of at least two interlaced components will occupy a common space, and will interlace such as to overlap, cross-over, interweave, interleave, or the like. In some embodiments, the lattice structures 410, 510 may be interlocking in such a manner that the first network of lattice members 412 and nodes 414 engages the second network of lattice members 512 and nodes 514. In exemplary embodiments, as shown in the illustration, the first network of lattice members 412 and nodes 414 is interlaced to be independent of and disengaged from the second network of lattice members 512 and nodes 514 such that the first network of lattice members 412 and nodes 414 does not contact the second network of lattice members 512 and nodes 514. This enables the first network of lattice members 412 and nodes 414 to provide some functionality independent of the second network of lattice members 512 and nodes 514 (e.g., different shapes, materials, thermal conductivity, thermal conduction paths, etc.), while also enabling the first network of lattice members 412 and nodes 414 to cooperate with the second network of lattice members 512 and nodes 514 to provide cooperative functionality (e.g., fluid flow characteristics through pores 422, balancing of overall design characteristics, etc.).

By way of example, and not limitation, the first network of lattice members 412 and nodes 414 being interlaced with the second network of lattice members 512 and nodes 514 (herein referred to as "interlaced lattice structures") enables smaller pores 422 of the overall lattice structure 224. For example, as the lattice members 412 and/or nodes 414 of lattice structure 410 penetrate the voids 516 of the lattice structure 510 (and vice versa), the open areas of the respective voids 416, 516 are divided to form multiple annulus-like pores 422, which permit smaller fluid flow areas and increase surface area. Such penetration of the voids 416, 516 by the respective portions of the lattice structures 410, 510 may enable the pores 422 to be smaller than otherwise practical when building the lattice structures 410, 510 by themselves (e.g., such as via additive manufacturing techniques, as described below). Alternatively or additionally, the interlaced lattice structures 410, 510 may enable separate heat conduction paths, in which the lattice structures 410, 510 may be at different temperatures or sink to different bodies, for example. Alternatively or additionally, such interlaced lattice structures 410, 510 may provide enhanced balance between flow path tortuosity (such as to promote mixing), wetted surface area (such as to promote mass and heat transfer), and/or solid volume (such as for calculating mass and overall size). It is understood that more than two such lattice structures may be interlaced with each other. It is also understood that the foregoing functions of the interlaced lattice structures 410, 510 are not intended to be limiting, and that other functions may be provided for particular applications, as would be understood by those having ordinary skill in the art.

In exemplary embodiments, the first lattice structure 410 and/or second lattice structure 510 (or additional lattice structures) are formed by a suitable additive manufacturing process. As is well-known in the art, additive manufacturing fabricates objects directly from a 3D model data by adding material layer upon layer. In this manner, the first lattice structure 410 and/or second lattice structure 510 each possess a unitary (monolithic) construction.

In exemplary embodiments, the lattice structures 410, 510 (or additional lattice structures) are each additively manufactured from, or on, a common substrate with each other, although the respective lattice structures 410, 510 (or additional lattice structures) may be additively manufactured from, or on, different substrates from each other. In exemplary embodiments, the substrate is a portion of the inner vessel 212, such as a sidewall of the inner vessel 212 (such as wall forming surface 230 in FIG. 4). Alternatively or additionally, the substrate may include an upper or lower wall of the inner vessel 212, such as the wall forming the inlet 222. Alternatively or additionally, the substrate on which the lattice structures 410, 510 are additively manufactured may form a portion of the outer vessel 210. For example, as described in further detail below, a portion of the overall lattice structure 224 may extend upstream of the inlet 222 into the annulus 214. In such an embodiment, the lattice structures 410, 510 may be additively manufactured on the tapered walls 238 of the outer vessel 210, for example. In exemplary embodiments, the lattice structures 410, 510 are unitary with the substrate (e.g., walls of the inner vessel 212 and/or outer vessel 210). For example, the additive manufacturing process may essentially "weld" the lattice structures to the wall(s) of the vessel(s) 210, 212 during fabrication, or the wall(s) of the vessel(s) 210, 212 themselves may be additively manufactured together with the lattice structures 410, 510. Such direct (e.g., unitary) connection may enhance the heat conduction path through the walls of the vessel(s) and through the lattice structures 410, 510 to maximize heating efficiency, such as by the heater 234 (or other heaters, as describe herein).

Additively manufacturing the lattice structures 410, 510 may provide numerous benefits for the different functions of the evaporator 114. For example, with respect to flow diffusion, additive manufacturing may better enable spatial tunability of the density or porosity of the lattice structures 410, 510 for flow field control. With respect to heat conduction, additive manufacturing may better enable continuous or seamless monolithic construction of the lattice structures 410, 510 which minimizes thermal contact resistance. With respect to high surface area, additive manufacturing may better enable spatially tunable surface area of the lattice structures 410, 510 for maximizing fuel wetting and evaporation. With respect to fluid control, additive manufacturing may better enable spatially tunable density or porosity of the lattice structures 410, 510 for bubble control or liquid droplet control. With respect to flame arresting, additive manufacturing may better enable spatially tunable density or porosity of the lattice structures 410, 510 for flame arresting and/or heat sinking. It is understood that the foregoing benefits provided by additive manufacturing the lattice structures 410, 510 are not intended to be limiting, and that other benefits may be provided for particular applications, as would be understood by those having ordinary skill in the art.

In exemplary embodiments where the lattice structures 410, 510 (or additional lattice structures) are interlaced with each other, additive manufacturing may provide additional benefits. For example, with respect to forming small, annulus-like pores 422, additive manufacturing the interlaced lattice structures 410, 510 may better enable the ability of the lattice structures to be non-contacting and may enable smaller pores than is otherwise practical by other processes. With respect to heat conduction, additive manufacturing the interlaced lattice structures 410, 510 may better enable the different lattice structures 410, 510 to come in close proximity to a common flow region without contacting each other. It is understood that the foregoing benefits provided by additive manufacturing the interlacing lattice structures 410, 510 are not intended to be limiting, and that other benefits may be provided for particular applications, as would be understood by those having ordinary skill in the art.

Any suitable additive manufacturing process may be utilized to form the lattice structures 410, 510, which may depend on the particular material utilized for the structures and the desired configuration of the structures, as would be understood by those having ordinary skill in the art. For example, suitable additive manufacturing processes may include: 3-D printing such as through Direct Metal Laser Sintering (DMLS) or stereolithography.

According to an aspect of the present disclosure, an exemplary method of additively manufacturing the lattice structure 224 includes starting with a substrate, such as a portion of the inner and/or outer vessel 210, 212, which may itself be additively manufactured. The method continues with additively manufacturing the first lattice structure 410, then additively manufacturing the second lattice structure 510. While the step of additively manufacturing the first lattice structure 410 is described as being first, since the forming of the first lattice structure 410 will generally begin at least slightly before the start of the second lattice structure 510, it will be recognized that the additive manufacturing of the first and second lattice structures 410, 510 generally occurs simultaneously over a period of time. In this manner the first lattice structure 410 may be formed such that it is interlaced with the second lattice structure 510, and vice versa, until the overall lattice structure 224 is formed.

Figure 11:
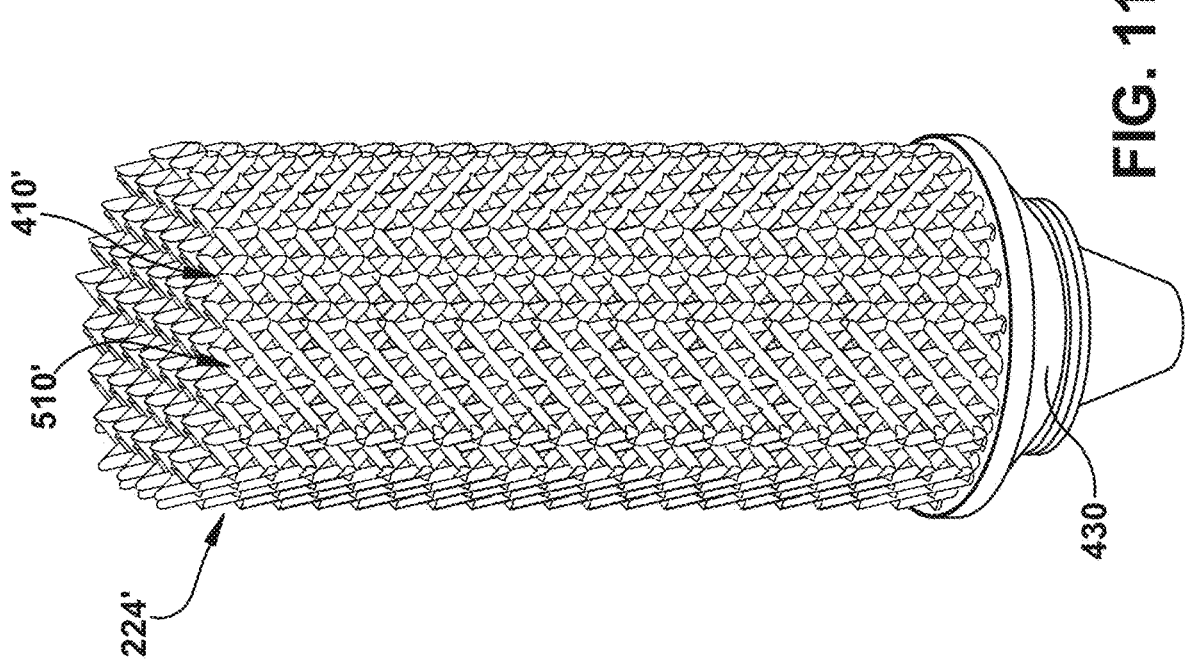
FIG. 11 is a photograph of an exemplary lattice structure according to an embodiment of the present disclosure.

Referring to FIG. 11, a photograph of an exemplary lattice structure 224' fabricated by DMLS is shown. The lattice structure 224' is the same as the lattice structure 224 described above, including interlaced and non-contacting lattice structures 410' and 510'. The lattice structure 224' is fabricated in a cylindrical shape and was additively manufactured on a funnel shaped substrate 430, which could form the inlet 222 of the inner vessel 212 of evaporator 114, for example. A jacket, shell, wall or other suitable housing could be fabricated or formed to encompass the lattice structure 224' to form that part of the inner vessel 212, for example.

Figure 12:
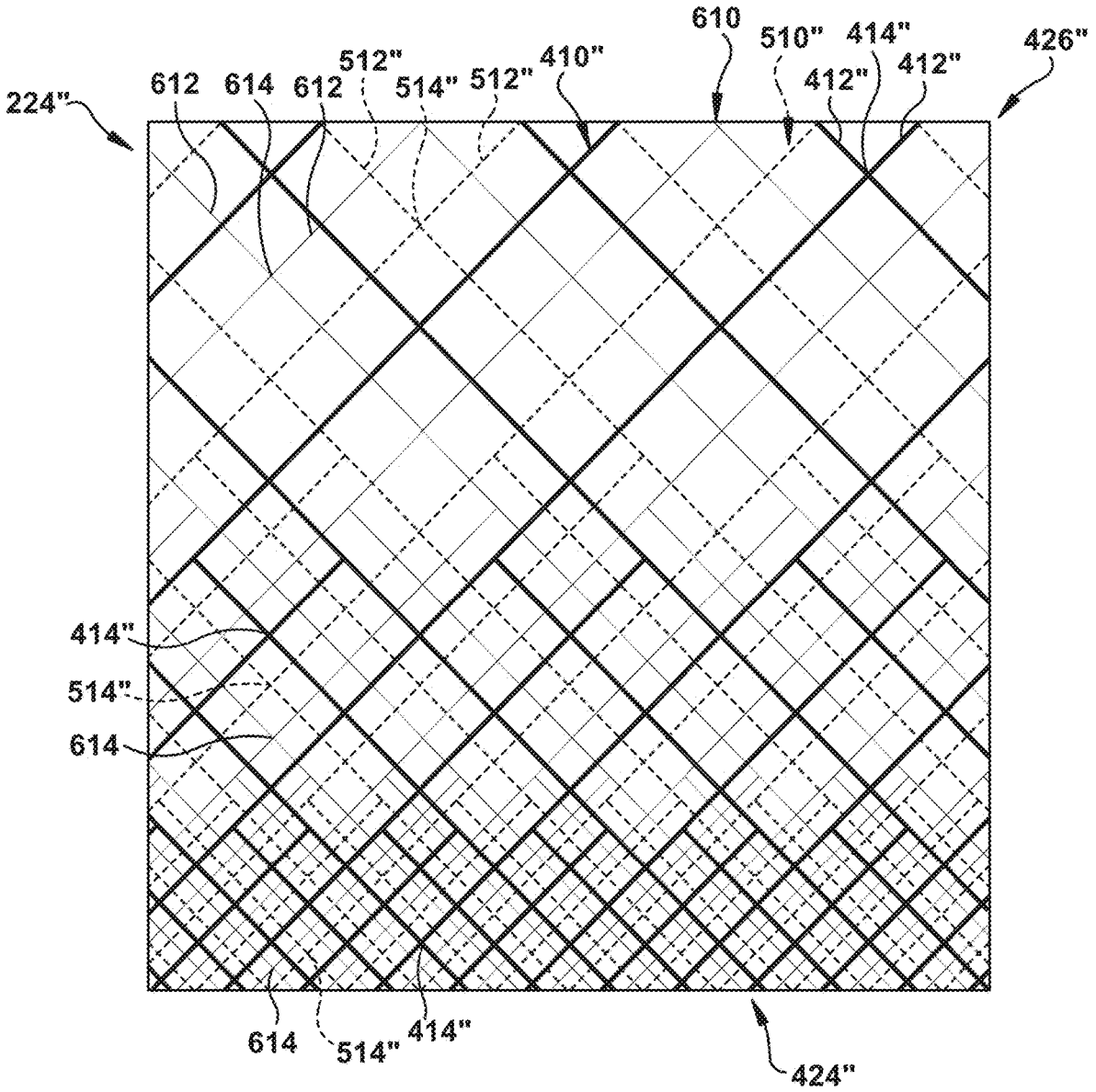
FIG. 12 is a two-dimensional schematic of another exemplary lattice structure according to an embodiment of the present disclosure.

Turning to FIG. 12, another exemplary embodiment of a lattice structure 224" is shown. The lattice structure 224" is similar to the above-reference lattice structure 224, except as noted below. Consequently, the same reference numerals but with a double-prime indicator are used to denote structures corresponding to similar structures in the lattice structures 224, 224". As such, the foregoing description of the lattice structure 224 is equally applicable to the lattice structure 224" except as noted below. Moreover, it is understood that aspects of the lattice structures 224, 224" may be substituted for one another or used in conjunction with one another where applicable.

As shown in the illustrated embodiment, the lattice structure 224" includes a first lattice structure 410" comprising a first network of lattice members 412", nodes 414" and voids (not referenced); a second lattice structure 510" comprising a second network of lattice members 512", nodes 514" and voids (not reference); and a third lattice structure 610 comprising a third network of lattice members 612, nodes 614 and voids (not referenced). In the illustrated embodiment, the first, second and third lattice structures 410", 510" and 610 are all interlaced with each other in a similar manner as described above such that respective lattice members and nodes of one lattice structure extend though the voids of one or more of the other lattice structures, and vice versa. In exemplary embodiments, the interlaced lattice structures 410", 510" and 610 are interlaced to be independent of and disengaged from each other such that they are non-contacting in a similar manner as described above.

In the illustrated embodiment, the lattice structures 410", 510" and 610 are each configured to vary the configuration of the respective lattice members (412", 512" and 612), nodes (414", 514" and 614), and voids (not referenced) from the inlet side 424" to the outlet side 426" of the overall lattice structure 224". More specifically, the lattice structures 410", 510" and 610 in the illustrated embodiment are varied to become progressively less dense in the vertical direction from the inlet side 424" to the outlet side 426", while maintaining their respective periodic structure in the lateral (horizontal) directions at each vertical position.

In exemplary embodiments, the lattice structure 224" is fabricated by an additive manufacturing process which facilitates formation of such a gradient structure. For example, to achieve such a lattice structure 224" while maintaining the interlaced structure, the spacing between lattice structures 410", 510" and 610 may be additively formed equally relative to each other. If a density gradient in the mesh structure is desired, for example, denser mesh to less dense mesh, the lattice structure may need to lose some elements uniformly in order for the structure to retain its basic shape. This corresponds to the spacing between the lattice members 412", 512" and 612 and doubling for each change in structure density, as shown in the illustrated embodiment. Such density growth of the lattice structure 224" may be optimal with an odd number of lattice structures 410", 510" and 610, with the arrangement order changing with each additive formation. For example, the order in FIG. 12 starts out as lattice structure 410" (black)—lattice structure 510" (blue)—lattice structure 610 (red) from left to right in the densest region, changes to lattice structure 410" (black)—lattice structure 610 (red)—lattice structure 510" (blue) in the middle region, and then back again to lattice structure 410" (black)—lattice structure 510" (blue)—lattice structure 610 (red) in the sparse region. When additively forming in three dimensions around a point, the overall lattice structure 224" can maintain its structure without losing any lattice members 412", 512" and 610, resulting in larger unit cells encompassing smaller ones.

In exemplary embodiments, the evaporator 114 includes one or more energizers that cooperate with the lattice structure 224 to facilitate liberation of the fuel vapors from the liquid fuel 116. The energizer(s) may be any suitable energizer(s) located at any suitable location(s). For example, the energizer may be a suitable heater, such as an electric heater, that is in thermal communication with the lattice structure 224 and provides heat to the liquid fuel to increase the temperature sufficiently to promote liberation (e.g., volatilize) of the fuel vapors, such as the lower molecular weight components of the liquid fuel. Alternatively or additionally, the energizer may include an ultrasonic transducer, for example, such as a mechanical, electromechanical or magnetostrictive transducer. In exemplary embodiments, the ultrasonic transducer is configured to generate ultrasonic vibration with sufficient energy to promote liberation of the fuel vapors, and more particularly is tuned to liberate the low molecular weight components of the liquid fuel into a vapor state while the heavier components of the fuel remain in the liquid state.

In the illustrated embodiment, the electric heater 234 is used as the energizer, which provides a simple and reliable way for facilitating or causing volatilization of the fuel vapors. As shown in the illustrated embodiment, for example, the heater 234 is connected to the fuel feed channel 232 which preheats the liquid fuel 116 prior to entering the plenum 214. The heat from the heater 234 is transferred via the walls and other structures of the evaporator 114 to the lattice structure 224, which provides sufficient heat to the liquid fuel 116 in contact with the surfaces of the lattice structure 224 to raise the temperature of the liquid fuel 116 and facilitate liberation of the fuel vapors. In exemplary embodiments, the temperature of the liquid fuel 116 is below the temperature at which the onset of boiling occurs for the liquid fuel, and thus there is no anticipation that bubbles of fuel vapor (without inlet gas) will form in the device. As shown, the heater 234 may be operatively coupled to the fuel feed channel 232 because it is easier to control the temperature of the liquid fuel 116 in a bulk single-phase region instead of the multi-phased dispersed region flowing through the lattice structure 224.

In exemplary embodiments, one or more heaters may be provided in thermal communication with the lattice structure 224 via walls of the evaporator 114 or other suitable thermal conduction paths. It is understood that the heater 234 may be located at any other suitable location and may take any other suitable form, or more than one such heater 234 may be employed. For example, one or more heater(s) may include blanket, cartridge or panel heater(s) operatively coupled to the wall(s) of the outer vessel 210 to preheat the inlet gas 118 and the liquid fuel 116 in the plenum 214, for example. Such heater(s) in such suitable location(s) also would be in thermal communication with the lattice structure 224 to promote volatilization of the fuel vapor, as discussed above.

One or more temperature sensors may be provided for measuring temperature at any desired location of the evaporator 114. In the illustrated embodiment, for example, a temperature sensor 240 is provided that measures the temperature of the liquid fuel 116 in the fuel feed channel 232. Alternatively or additionally, one or more temperature sensors may measure the temperature of the lattice structure 224, the fluid through the lattice structure 224, the fuel-enriched gas mixture 120 exiting the lattice structure 224, or any other desired temperature. The sensor(s) 240 and heater 234 may be operably coupled to a controller 242 for controlling the temperature of the liquid fuel 116, the lattice structure 224, the fuel-enriched gas mixture 120, or the like, which thereby controls the amount of fuel vapors contained in the gas mixture 120. Alternatively, the heater 234 may be passively controlled using a positive temperature coefficient (PTC) heater, for example.

In exemplary embodiments, the heater(s) 234 are controlled to provide the desired mole fraction of fuel vapor in the fuel-enriched gas mixture 120 (including volatized fuel vapor and fuel vapor contained in the inlet gas 118) that is introduced into the reactor 122. The fuel vapor mole fraction is equal to partial pressure divided by total pressure, and the partial pressure of the fuel vapor is a function of temperature. Therefore, to control the mole fraction of the fuel vapor introduced into the reactor 122, the temperature of the fuel feed channel 232, the heated lattice structure 224, the liquid fuel 116, and/or the fuel-enriched gas mixture 120 (or the like), may be controlled as a function of local ambient pressure (i.e., altitude). For example, the controller 242 that controls the heater 234 may receive feedback signals from an altitude sensor (not shown) and/or a pressure sensor (not shown), and utilize such feedback (such as with closed-loop logic) to control the heating of the fuel feed channel 232, the lattice structure 224, etc. Such temperature control may be varied during an entire flight profile to account for temperature and/or pressure (i.e., altitude) changes. Such temperature control also may control the degree of volatilization of the liquid fuel 116 into fuel vapors. In exemplary embodiments, the flow rate of the liquid fuel 116 into the evaporator 114 does not need to be controlled, provided a sufficient amount of fuel (e.g., at least a 10:1 mass ratio of liquid-fuel to vapor fuel) is continuously provided to the evaporator 114. Alternatively, the amount of liquid fuel 116 introduced into the evaporator 114 may be controlled, such as via feedback control of the pump 134 via a suitable controller (e.g., controller 242). In general, the resulting fuel-enriched gas mixture 120 of inlet gas 118 and volatilized fuel vapor is controlled to enhance the fuel vapor content of this reaction gas 120, such as slightly below the LFL (e.g., fuel to air equivalence ratio of about 0.5 for Jet A fuel (FIG. 2). This makes the reaction gas 120 inherently non-flammable, while also enhancing the reactor's conversion of the gas mixture 120 to the inert, non-flammable gas 124 in the inerting system 100.

In a non-liming example, a hypothetical set of conditions may be considered. Although numerous researchers have characterized flammability limits in various ways for various fuels, the Federal Aviation Administration (FAA) provides a numerical methodology in which flammability limits may be directly calculated in terms of fuel temperature as a function of altitude when the flash point of the fuel is known (reference 14 CFR Part 25, Appendix N). This methodology is useful in the context of setting a fuel temperature inside the fuel evaporator that is outside the range of the flammability limits. Using the mean flash point defined by the FAA of 120° F., the corresponding LFL at sea level is 10° F. below this value, which in the case of the mean flash point fuel is 110° F. The FAA also defines an LFL reduction as a function of altitude of 1° F. per every 808 feet above sea level. If an operating altitude of 10,000 feet above sea level is considered in this example, the LFL would then be 97.6° F. This result provides useful guidance for setting the operating temperature of the evaporator 114 as a function of altitude. For example, FIG. 2 suggests that the true vapor pressure of the Jet A fuel at this temperature would be approximately 0.102 psi. At 10,000 ft this partial pressure of fuel vapor would correspond to a mole fraction of fuel of approximately 0.7%. It may be desirable to operate the fuel evaporator 114 at a discharge mole fraction below this value. For this non-limiting example, a value of 0.5% fuel vapor by volume is used. Further assuming a nominal ullage gas flow rate into the fuel evaporator of 1 liter per second, the discharge fuel vapor mass flow rate would be approximately 1 g/min. Assuming that 10% of the liquid fuel 116 entering the fuel evaporator 114 is volatilized and carried away in the discharge stream 120, a liquid fuel flow rate 10× greater than the discharge fuel vapor flow rate may be desired. In the hypothetical case, a liquid fuel 116 flow rate of 10 g/min is desired, which implies that 9 g/min of non-volatilized liquid fuel 138 is returned to the fuel tank 112. It is understood that the foregoing is merely exemplary, and other suitable flow rates and/or quantities of the liquid fuel 116 may be introduced into the evaporator 114 as may be desired depending on the application or operational conditions, which would be understood by those having ordinary skill in the art.

Still referring to FIG. 4, as the liquid fuel 116 is pushed up through the lattice structure 224 in the inner vessel 212 (by the inlet gas 118 pressure exerted against the free surface 220 of the liquid fuel 116 in the plenum 214), the liquid fuel 116 will reach the liquid outlet 228 of the inner vessel 212 enabling the non-volatilized portion 138 of the liquid fuel to drain from the evaporator 114. As shown, the liquid outlet 228 may be configured as a window through a wall of the inner vessel 212 that is fluidly connected to a fuel outlet passage 244, such as a fluid channel or gutter, that is fluidly connected to a fuel discharge line 246. The non-volatilized liquid fuel 138 drains through the liquid outlet 228 into the fuel outlet passage 244 and out of the discharge line 246. In exemplary embodiments, the fuel discharge line 246 is fluidly connected to the liquid fuel return passage 142 of the inerting system 100 for returning the non-volatilized fuel 138 to the fuel tank 112. As shown in the illustrated embodiment, the fuel discharge line 246 may include a flow restriction orifice 248, such as a fixed restriction metering orifice, that meters the non-volatilized liquid fuel flow rate in a manner that maintains a non-zero liquid fuel head above the flow restriction orifice 248. This prevents any fuel-enriched gas mixture 120 that has escaped through the liquid outlet 228 from exiting through the fuel discharge line 246 by being contained above the liquid fuel head. The pressure from the fuel head and positive pressure from any gas stream within the fuel outlet passage 244 will tend to push non-volatilized liquid fuel 138 through the flow restriction orifice 248 and through the fuel discharge line 246, where the non-volatilized liquid fuel 138 can be returned to the fuel tank 112.

As discussed above, the fuel-enriched gas mixture 120 above the liquid fuel 116 inside the inner vessel 212 will contain a mixture of the inlet gas 118 that entered via gas inlet 216 and fuel vapor extracted from the liquid fuel 116 that entered via liquid inlet 218. In the illustrated embodiment, this fuel-enriched gas mixture 120 will flow upward past one or more baffles 250, through a flame arrestor 252, and then out of the evaporator 114 via the gas outlet 226. In exemplary embodiments, the gas outlet 226 is fluidly connected to the reactor supply conduit 140 of the inerting system 100 for being provided to the reactor 122.

As discussed above, in exemplary embodiments, each of the outer vessel 210 and inner vessel 212 is designed with a funnel shape and they are positioned relative to each other to enable productive liquid fuel and inlet gas interactions even when the evaporator 114 is tipped at an angle relative to the vertical position as shown. In addition, if the evaporator 114 is tipped on its side or upside down, then the liquid fuel 116 in the outer vessel 210 and fuel feed channel 232 will tend to collect in the plenum 214, and the liquid fuel 116 in the inner vessel 212 will be captured by the fuel baffles 250 instead of escaping out of the gas outlet 226 to the reactor 122. In this manner, the fuel baffles 250 are configured to restrict the liquid fuel 116 from exiting at the gas outlet 226.

The flame arrestor 252 may be configured with any suitable configuration, such as a disc or body with narrow axially elongated flow channels. The flow channels of the flame arrestor 252 may have a fluid flow area that is configured to enable passage of the fuel-enriched gas mixture 120 while also quenching a flame should one arise in the evaporator 114, thereby preventing such flame from traveling downstream to the reactor 122. In exemplary embodiments, the flame arrestor 252 is integrated into inner vessel 212, such as at the gas outlet 226.

In exemplary embodiments, a portion of the lattice structure 224, or other suitable structure, may be included upstream of the inner vessel inlet 222 (as shown at 254, for example) and/or downstream of the liquid outlet 228 (as shown at 256, for example). The respective upstream structure portion 254 and downstream structure portion 256 may have the same configuration as the lattice structure 224, or the structure in these respective portions 254 and/or 256 may be different. The upstream structure portion 254 may help in wicking the liquid fuel 116 into the inner vessel 212 and may help to prevent splashing inside of the plenum 214. The downstream structure portion 256 may serve as a coalescing filter where liquid fuel droplets can agglomerate and drain back into the liquid fuel 116 within the inner vessel 212, instead of through the gas outlet 226 toward the reactor 122. In addition, the configuration of the downstream structure portion 256 may have a porosity with a surface area that enables the downstream structure portion 256 to serve as a flame arrestor.

Figure 13:
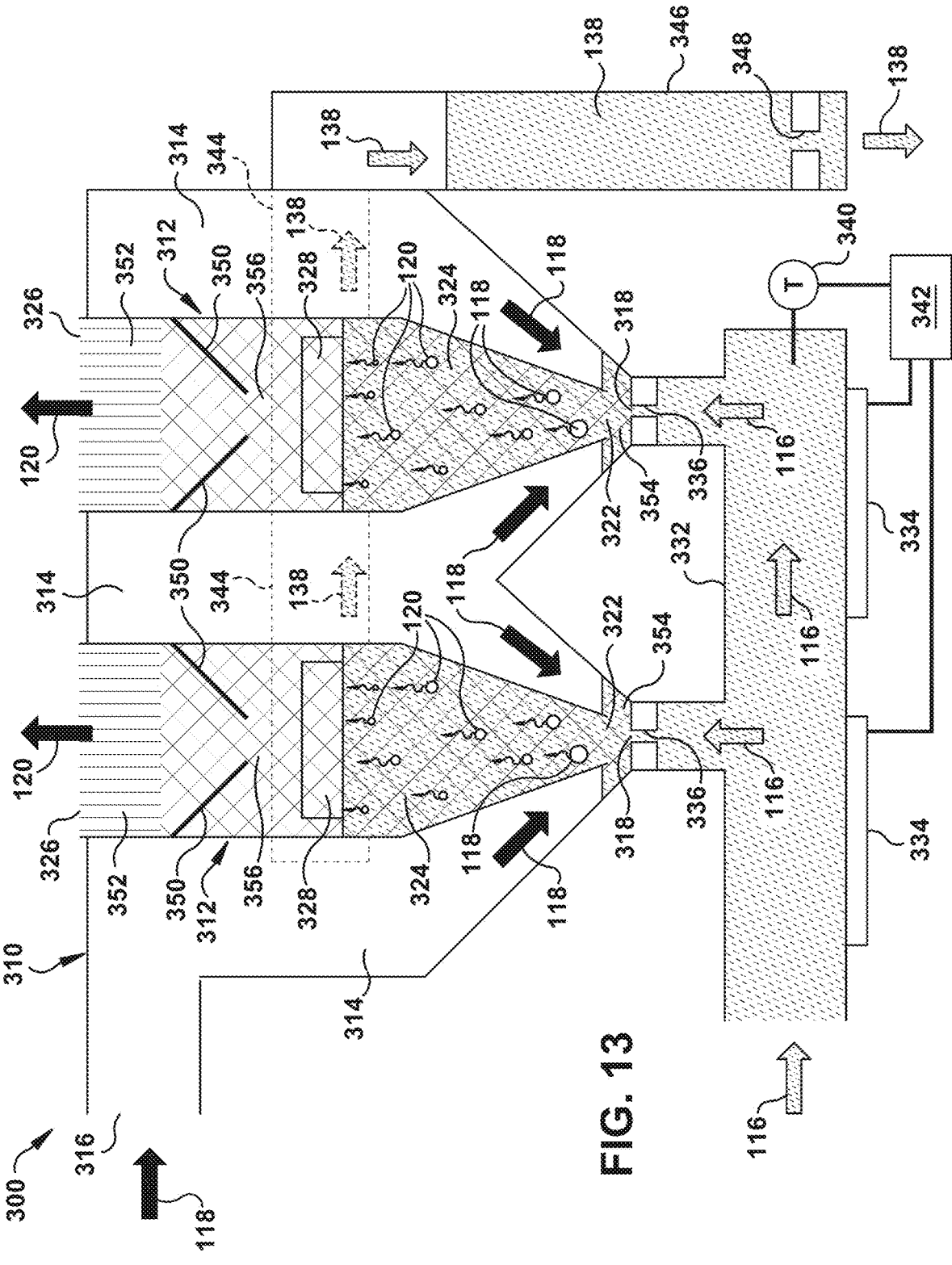
FIG. 13 is a schematic cross-sectional side view of another exemplary sparging evaporator according to an embodiment of the present disclosure that may be used in the inerting system in FIG. 3.

Turning now to FIG. 13, another exemplary embodiment of a sparging evaporator 300 is shown. The sparging evaporator 300 is substantially similar to the above-referenced sparging evaporator 114, and consequently the same reference numerals but in the 300-series are used to denote structures corresponding to similar structures in the sparging evaporators 114, 300. In addition, the foregoing description of the sparging evaporator 114 is equally applicable to the sparging evaporator 300, except as noted below. Similarly to the evaporator 114, the evaporator 300 may be utilized in an inerting system, such as the exemplary inerting system 100. Moreover, it is understood that aspects of the sparging evaporators 114, 300 may be substituted for one another or used in conjunction with one another where applicable.

As shown in the illustrated embodiment, the sparging evaporator 300 (also referred to as evaporator 300) effectively is two duplicate sparging evaporators 114 with one or more components combined. For example, in the illustrated embodiment, two outer vessels are combined in series into a single outer vessel 310 having a single plenum 314. In exemplary embodiments, only a single gas inlet 316 is provided into the single plenum 314. The evaporator 300 also may combine two fuel feed passages (e.g., channels or rails) into a single fuel feed channel 332 having two separate liquid inlets 318 into the plenum 314 of the outer vessel 310. Each liquid inlet 318 may have a metering orifice 336, as shown, and multiple heaters 334 may be provided for heating the fuel feed channel 332, or any other suitable structure as discussed above. One or more temperature sensors 340 may be provided for measuring temperature of the liquid fuel 116 in the fuel feed channel 332, or any other suitable location as discussed above. The heaters 334 and temperature sensor(s) 340 may be coupled to a controller 342 for controlling temperature. Alternatively, the heaters 334 may be passively controlled using a positive temperature coefficient (PTC) heater, for example.

As shown, the evaporator 300 includes two discrete inner vessels 312, and corresponding lattice structures 324 within the inner vessels 312, for respectively forming two sources of the fuel-enriched gas mixture 120 that exit the evaporator 300 via respective gas outlets 326. In exemplary embodiments, the inner vessels 312 and/or the respective lattice structures 324 may be the same as each other, or the inner vessels 312 and/or the respective lattice structures 324 may be different. As described above in connection with the lattice structure 224, the respective lattice structures 324 are configured to promote liberation of the fuel vapor from the liquid fuel 116 within the inner vessels 312, and enable the inlet gas 118 in the liquid fuel 116 to interact with and sparge the fuel vapor in the liquid fuel 116, thereby forming a fuel-enriched gas mixture 120. The respective lattice structures 324, or other suitable structures, may be included upstream of the respective inner vessel inlets 322 (as shown at 354, for example) and/or downstream of the respective liquid outlets 328 (as shown at 356, for example) in the same or similar manner as described above in connection with the evaporator 114. Also similarly to the evaporator 114, the evaporator 300 may include corresponding baffles 350 and flame arrestors 352 in each inner vessel 312. As shown, a single fuel outlet passage 344 is combined between the two inner vessels 312 to fluidly connect with the respective liquid outlets 328. The fuel outlet passage 344 drains the non-volatilized liquid fuel 138 into a single fuel discharge line 346. The fuel discharge line 346 may include a flow restriction orifice 348, such as a fixed restriction metering orifice, that meters the non-volatilized liquid fuel flow rate in a manner that maintains a non-zero liquid fuel head above the flow restriction orifice 348 in the same manner as described above.

In the illustrated embodiment, the outer vessel 310 is configured with an integrated dual-funnel shape, in which the liquid inlets 318 of the outer vessel 310 are arranged at respective bottom portions of the dual-funnel shape, and the respective inlets 322 of the inner vessels 312 are proximate the respective liquid inlets 318 of the outer vessel 310. Such a dual-funnel configuration with respective tapered surfaces 338 reduces the sensitivity of the evaporator 300 to changes in the relative angle between the free surface 220 and the inlet to the inner vessel 222 (such as from pitch or uncoordinated roll of the aircraft, for example) and better enables the liquid fuel 116 to be available near at least one of the inner vessel inlets 322 for pushing the liquid fuel 116 through the corresponding inner vessel 312 for volatilization of the fuel vapors. Such a dual-funnel configuration also enables better drainage of the liquid fuel 116 back into the fuel feed channel 332 to minimize fuel collection in the plenum 314. Such a parallel-combined evaporator 300 also effectively increases the aspect ratio of the device, which may reduce flow velocity to provide more even flow through and out of the device, which may aid in performance of the reactor 122. It is understood that although only two inner vessels 312 are shown in the illustrated embodiment, more than two inner vessels 312 (e.g., three, four, seven, ten or more) may be provided as may be desired for the particular application, as would be understood by those having ordinary skill in the art.

An exemplary inerting system 100 and/or sparging evaporator 114, 300 has been described herein. The sparging evaporator generally includes an outer vessel, an inner vessel within the outer vessel, and a plenum formed between the inner and outer vessels. The outer vessel includes a gas inlet for receiving inlet gas into the plenum, and a liquid inlet for receiving liquid fuel into the plenum. The inlet gas in the plenum generates a gas pressure that is exerted against a free surface of the liquid fuel in the plenum thereby forcing the liquid fuel and the inlet gas through an inlet of the inner vessel. The inner vessel contains a structure that promotes liberation of fuel vapor from the liquid fuel and enables the inlet gas in the liquid fuel to sparge the fuel vapor in the liquid fuel, thereby forming a fuel-enriched gas mixture that can be fed to a reactor of the inerting system.

Exemplary advantages of such an exemplary sparging evaporator 114, 300 may include, but are not limited to, one or more of the following, separately or in any combination: (i) maintain a safe but high-level fuel vapor at the inerting system's reactor inlet across the entire flight profile by simply controlling the evaporator's body temperature with a heat source; (ii) produce fuel vapors with a very small amount of heat since only a small amount of fuel is being continuously warmed up; (iii) avoid the need to actively control the fuel flow rate so long as a sufficient amount of fuel is continuously provided to the system; (iv) simultaneously evaporate fuel and mix with ullage air; (v) separate fuel vapor and liquid fuel by using inlet (e.g., ullage) gases to sweep fuel vapors against gravity and allows the liquid fuel to drain in direction of gravity; (vi) the evaporator can be oriented vertically or at an angle relative to vertical, so long as the unevaporated liquid fuel tends to drain into the tank; (vii) prevent liquid fuel from exiting the device into the downstream catalytic inerting system; (viii) prevent the fuel-enriched process gas mixture from short-circuiting back to the fuel tank without passing through the catalytic inerting system; (ix) separate most of the fuel contaminants from the fuel vapors that feed the catalytic reactor, which may result in longer reactor life.

In exemplary embodiments, the sparging evaporator 114, 300 may include, but is not limited to, one or more of the following exemplary features, separately or in any combination: (i) a suitable structure (such as a suitable mixing structure and/or heat-transfer structure), which may be a porous structure (e.g., a porous substrate, porous medium, porous bed, or the like), that is in intimate contact with both liquid fuel and inlet gas; (ii) the structure (e.g., porous structure) is heated and has a high surface area for heat transfer and mass transfer (evaporation), direct conductive path from heaters, promotes multi-phase mixing, provides a highly-uniform discharge stream in a compact distance, and/or prevents fuel splashing; (iii) an overall evaporator design that works across a range of aircraft attitudes due to inner vessel and outer vessel geometry (e.g., fuel funnel geometries and relative arrangement); (iv) integrated provisions to protect the catalytic inerting system, including baffles and catches for liquid fuel in case of a roll-over event and/or flame arrestor(s) to prevent a flame front from moving inside the device or discharging from the device; (v) architecture that returns unevaporated liquid fuel back to the fuel tank while preventing process gas mixture from short-circuiting back to the fuel tank; and (vi) architecture that provides an evenly mixed and uniform distribution of process gas flow to the catalytic reactor system.

An exemplary lattice structure 224, 224', 224" also has been described herein. In exemplary embodiments, the exemplary lattice structure 224, 224', 224" may include, but is not limited to, one or more of the following exemplary features, separately or in any combination: (i) uniformly expand a fluid flow from a small inlet port area to a large outlet port area (40:1 ratio) in a very short distance while maintaining good flow field uniformity at the outlet; (ii) provide a relatively large wetted surface area to promote mass transfer between a liquid film and a gas; (iii) encourage mixing between two fluids; (iv) provide a relatively low resistance heat transfer path from a heat source to a fluid, or from one fluid to another fluid; (v) inhibit liquid splashing; (vi) inhibit flame front propagation; (vii) provide a high surface area substrate for surface reaction; (viii) provide light-weight structural elements; and/or (ix) any of the other exemplary features described herein.

Although the unique lattice structure 224 has particular application for sparging evaporators, as described above, the unique aspect of interlaced and non-contacting lattice structures could be exploited in the following ways (but are not limited to): (i) an energy storage device, like a capacitor; (ii) spatially integrated heating elements; (iii) three-dimensional electrodes enabling a three-dimensional spark or a spark space or spark field rather than a linear spark as is typical of the spark that is generated across two electrodes; and (iv) mechanically isolated lattices could be excited independently to achieve a high degree of relative motion between the lattice elements.

Other aspects include a sender-receiver combination in which one lattice element is energized electrically or excited mechanically or some combination thereof and the other lattice, due to its interlaced and proximal nature to the excited lattice element reacts sympathetically to the excited lattice element. Such an aspect may include an amplifier, damper, or frequency transformer. Another aspect includes a cascading sending and receiving series of interlaced lattice elements.

Another aspect is changing the physical states of the parts of the lattice structures. In a first configuration, the lattice members are solid materials and the void space between them is fluid-either a gas or liquid or some combination thereof. One skilled in the art could modify the combinations of materials for the lattice members and the interstitial space to provide the following non-limiting examples (as referenced by lattice member 1/lattice member 2/interstitial space): (i) solid/solid/vacuum; (ii) solid/solid/gas, such as for spark field generators or motion frequency transformers; (iii) solid/solid/viscous fluid, such as for motion dampers; (iv) solid/solid/dielectric, such as for electrical capacitors; (v) fluid/fluid/solid, such as for heat exchangers; (vi) fluid/fluid/semi-permeable material, such as for mass-transfer mediums; (vii) semiconductor/semiconductor/semiconductor, such as for solid-state electrical circuits and logic elements.

According to an aspect of the present disclosure, a sparging evaporator includes: a gas stream inlet, a gas plenum and a fuel cone, through which gas flows; a liquid fuel inlet through which liquid fuel flows into the fuel cone, and a heater for heating the liquid fuel prior to its flow into the fuel cone; the fuel cone having a fuel cone inlet through which the liquid fuel is forced through and into the fuel cone by the pressure of the gas, wherein gas will bubble up through the liquid fuel in the mixing cone; a substrate inside the fuel cone which has a high heat transfer and high mass transfer for extracting fuel vapor from the liquid fuel, wherein a mixture of the fuel vapor and gas from the gas stream inlet exit through a process gas outlet where it is provided to an inerting system; a fuel window that allows liquid fuel to drain out of the fuel cone into a fuel gutter where it is collected and drained into a fuel outlet line.

According to another aspect, a fuel sparging system comprises a plurality of fuel sparging evaporators according to any of the foregoing in parallel.

According to a more specific aspect of the present disclosure, a sparging evaporator for a fuel tank inerting system includes: an outer vessel, an inner vessel within the outer vessel, and a plenum formed between the inner and outer vessels, the outer vessel having a gas inlet for receiving inlet gas, and a liquid inlet for receiving liquid fuel, wherein both the gas inlet and the liquid inlet are in fluid communication with the plenum; the inner vessel having an inner vessel inlet, a liquid outlet, and a gas outlet, wherein the inner vessel inlet is in fluid communication with the plenum; a heater in thermal communication with the liquid fuel, the heater being configured to heat and promote volatilization of at least a portion the liquid fuel to thereby form a volatilized fuel vapor; and a heat-transfer structure at least partially contained within the inner vessel, wherein the liquid fuel and the inlet gas flows through the heat-transfer structure when the evaporator is in use, the heat-transfer structure being in thermal communication with the heater and being configured to promote liberation of the volatilized fuel vapor from the liquid fuel; wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet and through the heat-transfer structure, whereby the inlet gas in the liquid fuel sparges the volatilized fuel vapor in the liquid fuel to thereby form a fuel-enriched gas mixture containing the inlet gas and the volatilized fuel vapor, wherein the fuel-enriched gas mixture is carried downstream and exits the sparging evaporator via the gas outlet, and wherein non-volatilized liquid fuel exits the sparging evaporator via the liquid outlet.

According to another aspect, a sparging evaporator includes: a gas stream inlet, a gas plenum and a fuel funnel, through which gas flows; a liquid fuel inlet through which liquid fuel flows into the fuel funnel, and a heater for heating the liquid fuel; a mixing funnel within the fuel funnel, the mixing funnel having a mixing funnel inlet through which the liquid fuel is forced through and into the mixing funnel by the pressure of the gas, wherein gas will bubble up through the liquid fuel in the mixing funnel; a porous medium inside the fuel funnel that transfers heat and promotes mass transfer for liberating fuel vapor from the liquid fuel, wherein a mixture of the fuel vapor and gas from the gas stream inlet exit through a gas outlet as a fuel-enriched gas mixture where it is provided as a process gas to an inerting system; and a fuel window that allows liquid fuel to drain out of the mixing funnel into a fuel outlet passage where it is collected and drained into a fuel outlet line.

According to another aspect, a sparging evaporator includes: an outer vessel, an inner vessel within the outer vessel, and a plenum formed between the inner and outer vessels, the outer vessel having a gas inlet for receiving inlet gas, and a liquid inlet for receiving liquid fuel, wherein both the gas inlet and the liquid inlet are in fluid communication with the plenum; the inner vessel having an inner vessel inlet and a gas outlet, wherein the inner vessel inlet is in fluid communication with the plenum; and a structure at least partially contained within the inner vessel that is configured to interact with the liquid fuel and the inlet gas; wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet to interact with the structure, the structure being configured to promote liberation of fuel vapor from the liquid fuel and enable the inlet gas in the liquid fuel to interact with and sweep away the fuel vapor to thereby form a fuel-enriched gas mixture containing the inlet gas and the fuel vapor, wherein the fuel-enriched gas mixture is carried downstream and exits the sparging evaporator via the gas outlet.

According to another aspect, a method of fuel-vapor enrichment of a process gas stream for an inerting system, includes: feeding an inlet gas into a plenum of a sparging evaporator; feeding liquid fuel into the plenum; exerting the inlet gas against a free surface of the liquid fuel in the plenum to force the liquid fuel and the inlet gas into a vessel having a structure that interacts with the liquid fuel, thereby causing fuel vapor to be liberated from the liquid fuel; sparging the fuel vapor with the inlet gas in the vessel to form a fuel-enriched gas mixture; and carrying the fuel-enriched gas mixture downstream through a gas outlet of the sparging evaporator.

According to an aspect of the present disclosure, a sparging evaporator for a fuel tank inerting system includes: a vessel having at least one inlet for ingress of liquid fuel and an inlet gas, and having a gas outlet; and a lattice structure at least partially contained within the vessel, wherein the lattice structure includes a network of lattice members and nodes with voids formed between the lattice members and nodes; wherein the sparging evaporator is configured such that, when in use, the liquid fuel and the inlet gas enter the vessel via the at least one inlet and interact with the lattice structure, which promotes liberation of fuel vapor from the liquid fuel and enables the inlet gas to interact with and sweep away the fuel vapor to thereby form a fuel-enriched gas mixture, wherein the fuel-enriched gas mixture is carried downstream and exits the sparging evaporator via the gas outlet.

Embodiments may include one or more of the following additional features, separately or in any combination.

In some embodiments, at least a portion of the lattice structure includes a repeating pattern of unit cells, wherein each unit cell includes at least one of the respective lattice members and at least one of the respective nodes.

In some embodiments, the lattice structure is a first lattice structure including a first network of lattice members and nodes that form voids between the lattice members and nodes, the sparging evaporator comprising a second lattice structure including a second network of lattice members and nodes with voids formed between the lattice members and nodes, wherein the first network of lattice members and nodes are interlaced with the second network of lattice members and nodes such that the first network of lattice members and nodes extends through the voids in the second network of lattice members and nodes.

In some embodiments, the first network of lattice members and nodes is independent of and disengaged from the second network of lattice members and nodes such that the first network of lattice members and nodes does not contact the second network of lattice members and nodes.

In some embodiments, at least a portion of the second lattice structure includes a second repeating pattern of second unit cells, wherein each second unit cell includes at least one of the respective second lattice members and at least one of the respective second nodes.

In some embodiments, the first network of lattice members and nodes and the second network of lattice members and nodes together form an overall lattice structure.

In some embodiments, spaces are formed between the first network of lattice members and nodes and the second network of lattice members and nodes.

In some embodiments, the spaces collectively form a porosity of the overall lattice structure, the porosity being in a range from 50% to 90% (open volume/total volume), more particularly in the range from 58% to 80% (open volume/total volume), such as 50%, 55%, 60%, 65%, 70%, 75%, 80%, 85% or 90% porosity.

In some embodiments, the first network of lattice members and nodes and the second network of lattice members and nodes together form an overall lattice structure.

In some embodiments, spaces are formed between the first network of lattice members and nodes and the second network of lattice members and nodes.

In some embodiments, the spaces have a size in the range from about 0.01 inches to about 0.2 inches, for example, such as 0.01, 0.02, 0.06, 0.1, 0.15, or 0.2 inches.

In some embodiments, the first network of lattice members and nodes is made of a first material.

In some embodiments, the second network of lattice members and nodes is made of a second material that is different than the first material.

In some embodiments, the first network of lattice members and nodes has a first thermal conductivity.

In some embodiments, the second network of lattice members and nodes has a thermal conductivity that is different than the first thermal conductivity.

In some embodiments, the thermal conductivity of the first network of lattice members and nodes is in a range from 20 W/m-K to 200 W/m-K.

In some embodiments, the thermal conductivity of the second network of lattice members and nodes is in a range from 20 W/m-K to 200 W/m-K.

In some embodiments, the sparging evaporator includes a substrate, and wherein the first lattice structure and the second lattice structure are connected to the substrate.

In some embodiments, the first lattice structure and the second lattice structure are unitary with the substrate.

In some embodiments, the substrate is a wall of the vessel.

In some embodiments, the substrate is a surface outside of the vessel.

According to another aspect of the present disclosure, a sparging evaporator includes: an outer vessel, an inner vessel within the outer vessel, and a plenum formed between the inner and outer vessels, the outer vessel having a gas inlet for receiving inlet gas, and a liquid inlet for receiving liquid fuel, wherein both the gas inlet and the liquid inlet are in fluid communication with the plenum; the inner vessel having an inner vessel inlet and a gas outlet, wherein the inner vessel inlet is in fluid communication with the plenum; and a lattice structure at least partially contained within the inner vessel, wherein the lattice structure includes a network of lattice members and nodes with voids formed between the lattice members and nodes; wherein the sparging evaporator is configured such that, when in use, the liquid fuel enters the plenum via the liquid inlet, and the inlet gas enters the plenum via the gas inlet, the inlet gas in the plenum generating a gas pressure that is exerted against a free surface of the liquid fuel in the plenum thereby forcing the liquid fuel and the inlet gas through the inner vessel inlet and through the lattice structure, the lattice structure being configured to promote liberation of fuel vapor from the liquid fuel and enable the inlet gas to interact with and sweep away the fuel vapor to thereby form a fuel-enriched gas mixture containing the inlet gas and the fuel vapor, wherein the fuel-enriched gas mixture is carried downstream and exits the sparging evaporator via the gas outlet.

Embodiments may include one or more of the following additional features, separately or in any combination.

In some embodiments, the sparging evaporator further includes: a heater in thermal communication with the liquid fuel, the heater being configured to heat and promote volatilization of at least a portion the liquid fuel to thereby form a volatilized fuel vapor; wherein, when the evaporator is in use, the lattice structure is in thermal communication with the heater to promote liberation of the fuel vapor from the liquid fuel.

In some embodiments, the lattice structure extends between at least the inner vessel inlet and the liquid outlet.

In some embodiments, the lattice structure extends to a region upstream of the inner vessel inlet.

In some embodiments, the lattice structure extends to a region downstream of the liquid outlet.

According to another aspect, a combination of the sparging evaporator according to any of the foregoing with a second sparging evaporator is provided wherein: the outer vessel of the sparging evaporator is integrated with a second outer vessel of the second sparging evaporator to form a single outer vessel of the combination, and such that the plenum forms a single plenum between the sparging evaporator and the second sparging evaporator; wherein the combination further includes: a second inner vessel within the single outer vessel that is arranged within the single plenum, the second inner vessel having a second inner vessel inlet, a second liquid outlet, and a second gas outlet, wherein the second inner vessel inlet is in fluid communication with the single plenum; a second lattice structure at least partially contained within the second inner vessel; a second liquid inlet for receiving the liquid fuel into the single plenum; wherein the gas inlet is a single gas inlet of the combination that is in fluid communication with the single plenum; wherein the liquid inlet and the second liquid inlet are fluidly connected via a single fuel feed passage; and wherein the liquid outlet and the second liquid outlet are fluidly connected via a single fuel outlet passage that is fluidly connected to a single fuel discharge line.

According to another aspect, an inerting system for a fuel tank includes: a fluid circuit fluidly connectable to the fuel tank; a reactor connected in the fluid circuit; and the sparging evaporator according to any of the foregoing that is connected in the fluid circuit upstream of the reactor; wherein the sparging evaporator is configured to receive a flow of the liquid fuel from the fuel tank, and wherein the evaporator is configured to receive at least a portion of flow of the inlet gas from ullage gas in the fuel tank; wherein the reactor is configured to convert at least a portion of the fuel-enriched gas mixture into an inert, non-flammable gas; and wherein the fluid circuit is configured to supply at least a portion of the inert, non-flammable gas to the fuel tank.

According to another aspect of the present disclosure, a method of forming a sparging evaporator includes: providing or forming a fluid vessel having at least one inlet and at least one outlet; additively manufacturing a first lattice structure including a first network of lattice members and nodes with voids formed between the lattice members and nodes; and simultaneous with additively manufacturing the first lattice structure, additively manufacturing a second lattice structure including a second network of lattice members and nodes with voids formed between the lattice members and nodes, the first network of lattice members and nodes being interlaced with the second network of lattice members and nodes such that the first network of lattice members and nodes extends through the voids in the second network of lattice members and nodes; wherein the first lattice structure and the second lattice structure are at least partially contained within the vessel.

According to another aspect, a capacitor includes a first network of lattice members and nodes that form voids between the lattice members and nodes, a second lattice structure including a second network of lattice members and nodes with voids formed between the lattice members and nodes, wherein the first network of lattice members and nodes are interlaced with the second network of lattice members and nodes such that the first network of lattice members and nodes extends through the voids in the second network of lattice members and nodes.

According to another aspect, a spatially integrated heating element includes a first network of lattice members and nodes that form voids between the lattice members and nodes, a second lattice structure including a second network of lattice members and nodes with voids formed between the lattice members and nodes, wherein the first network of lattice members and nodes are interlaced with the second network of lattice members and nodes such that the first network of lattice members and nodes extends through the voids in the second network of lattice members and nodes.

According to another aspect, a three-dimensional electrode enabling a three-dimensional spark or a spark space includes a first network of lattice members and nodes that form voids between the lattice members and nodes, a second lattice structure including a second network of lattice members and nodes with voids formed between the lattice members and nodes, wherein the first network of lattice members and nodes are interlaced with the second network of lattice members and nodes such that the first network of lattice members and nodes extends through the voids in the second network of lattice members and nodes.

According to another aspect, a mechanically isolated lattice includes a first network of lattice members and nodes that form voids between the lattice members and nodes, a second lattice structure including a second network of lattice members and nodes with voids formed between the lattice members and nodes, wherein the first network of lattice members and nodes are interlaced with the second network of lattice members and nodes such that the first network of lattice members and nodes extends through the voids in the second network of lattice members and nodes.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

As used herein, an "operative connection," or a connection by which entities are "operatively connected," is one in which the entities are connected in such a way that the entities may perform as intended. An operative connection may be a direct connection or an indirect connection in which an intermediate entity or entities cooperate or otherwise are part of the connection or are in between the operatively connected entities. An operatively connection or coupling may include the entities being integral and unitary with each other, for example.

It is to be understood that all ranges and ratio limits disclosed in the specification and claims may be combined in any manner. It is to be understood that unless specifically stated otherwise, references to "a," "an," and/or "the" may include one or more than one, and that reference to an item in the singular may also include the item in the plural.

The term "about" as used herein refers to any value which lies within the range defined by a variation of up to +10% of the stated value, for example, +10%, +9%, +8%, +7%, +6%, +5%, +4%, +3%, +2%, +1%, +0.01%, or +0.0% of the stated value, as well as values intervening such stated values.

The phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A sparging system comprising:
a first sparging evaporator, comprising:
a first outer vessel, a first inner vessel within the first outer vessel, and a plenum formed between the first inner and outer vessels,
the first outer vessel having a gas inlet for receiving inlet gas, and a first liquid inlet for receiving liquid fuel, wherein both the gas inlet and the first liquid inlet are in fluid communication with the plenum;
the first inner vessel having a first inner vessel inlet and a first gas outlet, wherein the first inner vessel inlet is in fluid communication with the plenum; and
a first lattice structure at least partially contained within the first inner vessel, wherein the first lattice structure includes a network of lattice members and nodes with voids formed between the lattice members and nodes; and
a second sparging evaporator, wherein the first outer vessel of the first sparging evaporator is integrated with a second outer vessel of the second sparging evaporator to form a single outer vessel of a combination of the first and second sparging evaporators, such that the plenum forms a single plenum between the first sparging evaporator and the second sparging evaporator;
wherein the second sparging evaporator includes:
a second inner vessel within the single outer vessel that is arranged within the single plenum, the second inner vessel having a second inner vessel inlet, a second liquid outlet, and a second gas outlet, wherein the second inner vessel inlet is in fluid communication with the single plenum;
a second lattice structure at least partially contained within the second inner vessel; and
a second liquid inlet for receiving the liquid fuel into the single plenum;
wherein the gas inlet is a single gas inlet of the combination that is in fluid communication with the single plenum;
wherein the first liquid inlet and the second liquid inlet are fluidly connected via a single fuel feed passage;
wherein the first liquid outlet and the second liquid outlet are fluidly connected via a single fuel outlet passage that is fluidly connected to a single fuel discharge line; and
wherein the first and second sparging evaporators are configured such that, when in use, the liquid fuel enters the plenum via the first and second liquid inlets, and the inlet gas enters the plenum via first gas inlet, the inlet gas in the plenum generating a gas pressure that is exerted against a free surface of the liquid fuel in the plenum thereby forcing the liquid fuel and the inlet gas through the first and second inner vessel inlets and through the first and second lattice structures, the first and second lattice structures being configured to promote liberation of fuel vapor from the liquid fuel and enable the inlet gas to interact with and sweep away the fuel vapor to thereby form a fuel-enriched gas mixture containing the inlet gas and the fuel vapor, wherein the fuel-enriched gas mixture is carried downstream and exits the first sparging evaporator via the first and second gas outlets.

2. The sparging system according to claim 1, wherein at least a portion of each of the first and second lattice structures includes a repeating pattern of unit cells, wherein each unit cell includes at least one of the respective lattice members and at least one of the respective nodes.

3. The sparging evaporator according to claim 1, wherein each of the first and second lattice structures comprises a first network and a second network of lattice members and nodes that form voids between the lattice members and nodes.

4. The sparging evaporator according to claim 3, wherein the first network of lattice members and nodes is independent of and disengaged from the second network of lattice members and nodes such that the first network of lattice members and nodes does not contact the second network of lattice members and nodes.

5. The sparging evaporator according to claim 3, wherein the first network of lattice members and nodes and the second network of lattice members and nodes together form an overall lattice structure;

wherein spaces are formed between the first network of lattice members and nodes and the second network of lattice members and nodes, and wherein the spaces collectively form a porosity of the overall lattice structure, the porosity being in a range from 50% to 90% (open volume/total volume).

6. The sparging evaporator according to claim 3, wherein the first network of lattice members and nodes and the second network of lattice members and nodes together form an overall lattice structure;

wherein spaces are formed between the first network of lattice members and nodes and the second network of lattice members and nodes, and wherein the spaces have a size in the range from about 0.01 inches to about 0.2 inches.

7. The sparging evaporator according to claim 3, wherein the first network of lattice members and nodes is made of a first material, and wherein the second network of lattice members and nodes is made of a second material that is different than the first material.

8. The sparging evaporator according to claim 3, wherein the first network of lattice members and nodes has a first thermal conductivity, and wherein the second network of lattice members and nodes has a thermal conductivity that is different than the first thermal conductivity.

9. The sparging evaporator according to claim 8, wherein the thermal conductivity of the first network of lattice members and nodes is in a range from 20 W/m-K to 200 W/m-K; and wherein the thermal conductivity of the second network of lattice members and nodes is in a range from 20 W/m-K to 200 W/m-K.

10. The sparging evaporator according to claim 3, wherein the first and second sparging evaporators include a substrate, and wherein the first lattice structure and the second lattice structure are connected to the substrate.

11. The sparging evaporator according to claim 10, wherein the first lattice structure and the second lattice structure are unitary with the substrate.

12. The sparging evaporator according to claim 10, wherein the substrate respectively is a wall of the single outer vessel.

13. The sparging evaporator according to claim 12, wherein the substrate is a surface outside of the single outer vessel.

14. The sparging system according to claim 1, further comprising:

a heater in thermal communication with the liquid fuel, the heater being configured to heat and promote volatilization of at least a portion the liquid fuel to thereby form a volatilized fuel vapor; and wherein, when the first and second evaporators are in use, the first and second lattice structures are in thermal communication with the heater to promote liberation of the fuel vapor from the liquid fuel.

15. An inerting system for a fuel tank, the inerting system comprising:

a fluid circuit fluidly connectable to the fuel tank;

a reactor connected in the fluid circuit; and the sparging system according to claim 1 that is connected in the fluid circuit upstream of the reactor;

wherein the first and second sparging evaporator are configured to receive a flow of the liquid fuel from the fuel tank, and wherein the first and second evaporators are configured to receive at least a portion of flow of the inlet gas from ullage gas in the fuel tank;

wherein the reactor is configured to convert at least a portion of the fuel-enriched gas mixture into an inert, non-flammable gas; and wherein the fluid circuit is configured to supply at least a portion of the inert, non-flammable gas to the fuel tank.

* * * * *